United States Patent
Radzewsky et al.

(10) Patent No.: US 11,188,398 B1
(45) Date of Patent: Nov. 30, 2021

(54) DIGITAL PROCESSING SYSTEMS AND METHODS FOR THIRD PARTY BLOCKS IN AUTOMATIONS IN COLLABORATIVE WORK SYSTEMS

(71) Applicant: MONDAY.COM LTD., Tel Aviv (IL)

(72) Inventors: Shanee Radzewsky, Tel Aviv (IL); Eliran Zagbiv, Tel Aviv (IL); Meytal Badichi, Tel Aviv (IL); Abigail Pagi, Herzliya (IL)

(73) Assignee: MONDAY.COM LTD., Tel Aviv (IL)

(*) Notice: Subject to any disclaimer, the term of this patent is extended or adjusted under 35 U.S.C. 154(b) by 0 days.

(21) Appl. No.: 17/243,764

(22) Filed: Apr. 29, 2021

Related U.S. Application Data

(63) Continuation of application No. 17/242,452, filed on Apr. 28, 2021.

(60) Provisional application No. 63/148,092, filed on Feb. 10, 2021, provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020.

(51) Int. Cl.
*G06F 9/54* (2006.01)

(52) U.S. Cl.
CPC .............. *G06F 9/542* (2013.01); *G06F 9/548* (2013.01)

(58) Field of Classification Search
CPC .............................. G06F 9/4812; G06F 9/542
USPC ........................................................ 719/318
See application file for complete search history.

(56) References Cited

U.S. PATENT DOCUMENTS

2017/0316363 A1* 11/2017 Siciliano ................ G06Q 10/10

* cited by examiner

*Primary Examiner* — Andy Ho
(74) *Attorney, Agent, or Firm* — Finnegan, Henderson, Farabow, Garrett & Dunner, LLP

(57) ABSTRACT

Systems, methods, and computer-readable media for remotely automating changes to third party applications from within a primary application are disclosed. The systems and methods may involve maintaining in the primary application, a table having rows, columns, and cells at intersections of the rows and columns, wherein the primary application is configured to enable the construction of automations defined by conditional rules for altering internal information in the primary application and external information in the third party applications; receiving an automation definition conditional on specific information input into at least one specific cell in the table of the primary application, wherein the automation definition is constructed using internal blocks and external blocks, the external blocks having links to the external third party applications; monitoring the at least one specific cell of the primary application for an occurrence of the specific information.

20 Claims, 22 Drawing Sheets

Account Activity Expanded ~1900

| Date/Time | Status | Category | Description |
|---|---|---|---|
| 12.12.20 18:51 | Failed | Error handling | When this week contains more items than 7, notify Sue Jones<br>Missing person to notify [Resolve] ~1920 |
| 1904 ~ 18:43 | | | ⊕ Group name: This week > Contains more item than 7 |
| 1906 ~ 18:51 | | | ⊗ notify Sue Jones |
| 12.12.20 18:51 | Pending ○ | Autopilot road map | When status changes to done, notify John Green |
| 1910 ~ 18:50 | | | ⊗ Item name: New connection screen<br>Status changed from Working on it > Done |
| 1912 ~ 18:51 | | | ⊕ notify John Green |
| 12.12.20 18:45 | Success | DOW | When Status changes to Done move item to this week and assign Mary... |
| 1916 ~ 18:42 | | | ⊗ Item name: New connection screen<br>Status changed from Working on it > Done |
| 1918 ~ 18:45 | | | ⊕ Item moved to > This week group and Assign Mary Brown |

Automations activity — 2100

Date and Time — 2102  Status — 2104  Board — 2106  Automations — 2108

| Date and Time | Status | Board | Automation |
|---|---|---|---|
| | All ˅ | Autopilot Roadmap ˅ | When Date arrives ✉ Send an email to Ann Smith ˅ |

2110  2112  2114  2116

| Date and Time | Status | Board | Automation | |
|---|---|---|---|---|
| 12.12.20 18:51 | Pending ⟳ | Autopilot road map | When Date arrives ✉ Send an email to Ann Smith | ˃ |
| 12.12.20 18:51 | Failed | Autopilot road map | When Date arrives ✉ Send an email to Ann Smith<br>Missing Status column [Resolve] ~2124 | ˃ |
| 12.12.20 18:45 | Success | Autopilot road map | When Date arrives ✉ Send an email to Ann Smith | ˃ |

2118  2120  2122

☺ Feedback

FIG. 21

| Automations Center | Board Automations / 11 | Account Usage 2202 | 2204 |

↗ Board Activity / 0     + Add new automation

11 Active automations on this board

A    When Released To changes to Everyone notify Mike White  2206
                                                            2208  On◯  288238  ⋯
                                                    2210 ⌇  ☑ Automation ID: 26134338
                                                            Created by Mike White - Updated 2 months a...

+    When Released To changes to Everyone create an item in  2212
     Partners Certification: New Content from...
                                                            2214  On◯  183  ⋯
                                                    2216 ⌇  ☑ Automation ID: 23941215
                                                            Created by Jen Gray - Updated 2 months ago +    When an item is created in this board, create an item in another board and  2218
     connect them in the selected board
                                                            2220  On◯  227  ⋯
                                                    2222 ⌇  ☑ Automation ID: 22295465
                                                            Created by Mike White - Updated 3 months a...

◇ ▦  When Released To changes to anything, notify Jane Black  2224
                                                            2226  On◯  19  ⋯
                                                    2228 ⌇  ☑ Automation ID: 22229814
                                                            Created by Jane Black - Updated 3 months ago

DIGITAL PROCESSING SYSTEMS AND METHODS FOR THIRD PARTY BLOCKS IN AUTOMATIONS IN COLLABORATIVE WORK SYSTEMS

CROSS-REFERENCE TO RELATED APPLICATIONS

This application is based on and claims benefit of priority of U.S. Nonprovisional patent application Ser. No. 17/242,452 filed on Apr. 28, 2021, which claims priority to U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed on Dec. 4, 2020, U.S. Provisional Patent Application No. 63/122,439, filed on Dec. 7, 2020, and U.S. Provisional Patent Application No. 63/148,092, filed on Feb. 10, 2021, the contents of all of which are incorporated herein by reference in their entireties.

TECHNICAL FIELD

Embodiments consistent with the present disclosure include systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

A system for remotely automating changes to third party applications from within a primary application, the system comprising: at least one processor configured to: maintain in the primary application, a table having rows, columns, and cells at intersections of the rows and columns, wherein the primary application is configured to enable the construction of automations defined by conditional rules for altering internal information in the primary application and external information in the third party applications; receive an automation definition conditional on specific information input into at least one specific cell in the table of the primary application, wherein the automation definition is constructed using internal blocks and external blocks, the external blocks having links to the external third party applications; monitor the at least one specific cell of the primary application for an occurrence of the specific information; and upon detection of the occurrence of the specific information, trigger functionality of the third party applications.

In the course of collaboration between different users, each of whom may be using different automations or different automation combinations and techniques, there may exist a technical challenge to troubleshoot a growing number of automation tasks that may be associated with one or more boards. For example, there may be a technical challenge to identify rules performed in each automation and ensure that there are no logical errors when there may be hundreds of automations operating on one or more boards. Therefore, there is a need for unconventional approaches to enable a user to pinpoint a specific automation that may include an error and troubleshoot the implemented automation. Various embodiments of the present disclosure describe unconventional systems and methods automation troubleshooting. The various embodiments the present disclosure describe at least a technological solution, based on improvement to operations of computer systems and platforms, to the technical challenge of troubleshooting automation tasks.

Specifically, aspects of this disclosure provides systems, methods, devices, and non-transitory computer readable mediums for troubleshooting faulty automations in tablature. Systems, methods, devices, and non-transitory computer readable mediums may include at least one processor configured to maintain a table containing data; store a plurality of logical sentence structures that may serve as logical rules to conditionally act on the data in the table, wherein each logical rule may be enabled to act at differing times in response to differing conditional changes; activate the logical rules so that each rule is in effect simultaneously; as each logical rule performs an action on the data, record the action and an associated time stamp in an activity log; receive a query to identify most recent actions performed on the table; access the activity log to identify at least one most recent action performed on the table; and present at least one specific logical sentence structure underlying at least one logical rule that caused the at least one most recent action.

BRIEF DESCRIPTION OF THE DRAWINGS

FIG. 19 is an exemplary representation of an expanded account activity viewing interface of a system for troubleshooting faulty automations in tablature, consistent with some embodiments of the present disclosure.

FIG. 21 is an exemplary representation of an automation activity interface with applied filters of a system for troubleshooting faulty automations in tablature, consistent with some embodiments of the present disclosure.

FIG. 22 is an exemplary representation of board automation view interface of a system for troubleshooting faulty automations in tablature, consistent with some embodiments of the present disclosure.

DETAILED DESCRIPTION

Figure 1:
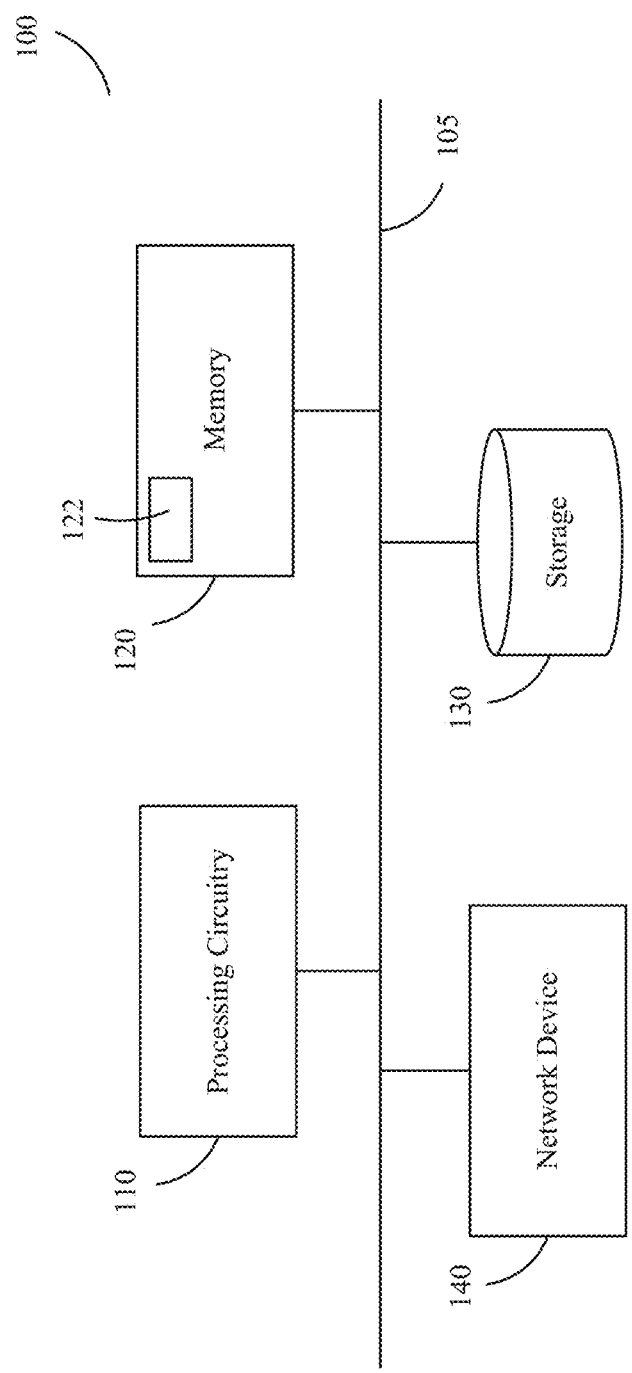
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. To avoid repetition, the functionality of some embodiments is described herein solely in connection with a processor or at least one processor. It is to be understood that such exemplary descriptions of functionality applies equally to methods and computer readable media and constitutes a written description of systems, methods, and computer readable media. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. Tablature may refer to any structure for presenting data in an organized manner, as previously discussed. such as cells presented in horizontal rows and vertical columns, vertical rows and horizontal columns, a tree data structure, a web chart, or any other structured representation, as explained throughout this disclosure. A cell may refer to a unit of information contained in the tablature defined by the structure of the tablature. For example, a cell may be defined as an intersection between a horizontal row with a vertical column in a tablature having rows and columns. A cell may also be defined as an intersection between a horizontal and a vertical row, or an intersection between a horizontal and a vertical column. As a further example, a cell may be defined as a node on a web chart or a node on a tree data structure. As would be appreciated by a skilled artisan, however, the disclosed embodiments are not limited to any specific structure, but rather may be practiced in conjunction with any desired organizational arrangement. In addition, a tablature may include any suitable information. When used in conjunction with a workflow management application, the tablature may include any information associated with one or more tasks, such as one or more status values, projects, countries, persons, teams, progresses, a combination thereof, or any other information related to a task.

While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™ BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

Some embodiments include one or more of automations, logical rules, logical sentence structures and logical (sentence structure) templates. While these terms are described herein in differing contexts, in a broadest sense, in each instance an automation may include a process that responds to a trigger or condition to produce an outcome; a logical rule may underly the automation in order to implement the automation via a set of instructions; a logical sentence structure is one way for a user to define an automation; and a logical template/logical sentence structure template may be a fill-in-the-blank tool used to construct a logical sentence structure. While all automations may have an underlying logical rule, all automations need not implement that rule through a logical sentence structure. Any other manner of defining a process that respond to a trigger or condition to produce an outcome may be used to construct an automation.

Other terms used throughout this disclosure in differing exemplary contexts may generally share the following common definitions.

In some embodiments, machine learning algorithms (also referred to as machine learning models or artificial intelligence in the present disclosure) may be trained using training examples, for example in the cases described below. Some non-limiting examples of such machine learning algorithms may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning algorithm may comprise an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. Further, in some examples, training machine learning algorithms using the training examples may generate a trained machine learning algorithm, and the trained machine learning algorithm may be used to estimate outputs for inputs not included in the training examples. In some examples, engineers, scientists, processes and machines that train machine learning algorithms may further use validation examples and/or test examples. For example, validation examples and/or test examples may include example inputs together with the desired outputs corresponding to the example inputs, a trained machine learning algorithm and/or an intermediately trained machine learning algorithm may be used to estimate outputs for the example inputs of the validation examples and/or test examples, the estimated outputs may be compared to the corresponding desired outputs, and the trained machine learning algorithm and/or the intermediately trained machine learning algorithm may be evaluated based on a result of the comparison. In some examples, a machine learning algorithm may have parameters and hyper parameters, where the hyper parameters are set manually by a person or automatically by a process external to the machine learning algorithm (such as a hyper parameter search algorithm), and the parameters of the machine learning algorithm are set by the machine learning algorithm according to the training examples. In some implementations, the hyper-parameters are set according to the training examples and the validation examples, and the parameters are set according to the training examples and the selected hyper-parameters.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
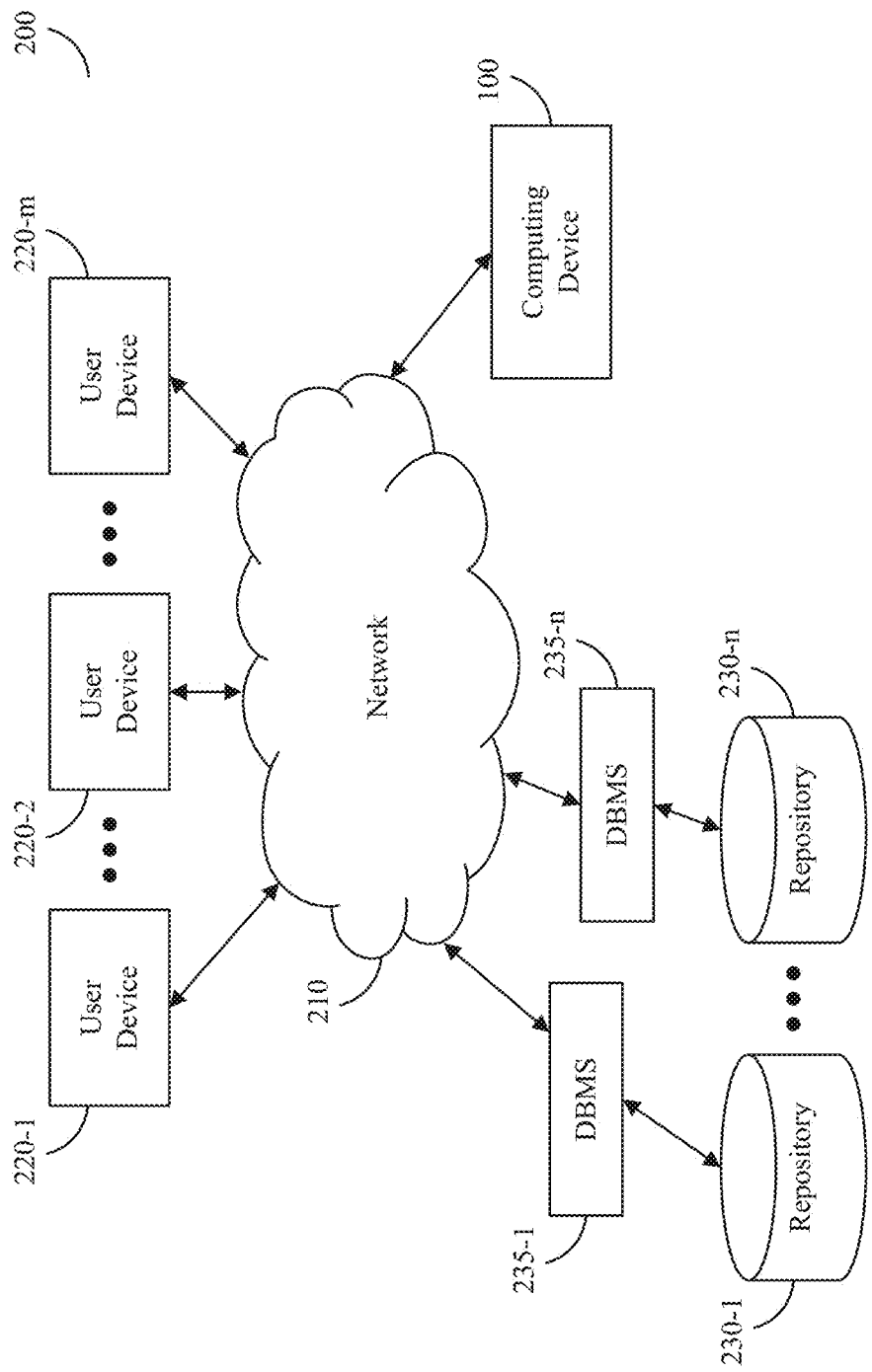
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-$m$, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-$n$, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-$n$. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

In collaborative workspaces, it is desirable for collaborators to have control over processes occurring over multiple different platforms while maintaining uniformity across different platforms and involving multiple processes. A collaborator may use a primary application as a main working environment, while functionality of third-party applications may be integrated into the primary application. A way to enhance a collaborator's control may be to enable rules-based processing so that processes are automated and may occur seamlessly across different platforms. For example, upon conditions being met with respect to a primary application or third party application, processes may cause changes in the primary application or third party application. However, involving the functionality of third party applications can be a difficult task. Third party applications may have their own unique operations and their own communication protocols. These may not be compatible with a primary application that the collaborator wishes to use as his or her main working environment. Although it may be possible for an individual user to log in to each individual third party application and synchronize tasks manually, systems and methods for automatically making changes to third party applications using rules that are based on both primary and third party applications are lacking.

Therefore, there is a need for unconventional approaches to enable a collaborator to automate changes to third party applications from within a primary application through rules-based techniques to provide solutions for enhancing control over processing occurring over multiple different platforms.

In some embodiments, there may be provided systems, methods, and computer readable media for remotely automating changes to third party applications from within a primary application. Remotely automating changes to third party applications from within a primary application may include causing actions and alterations to applications that are external to the primary application (e.g., a third party application). For example, a primary application and its associated data may be located by a first provider that may automate changes to a third party application and its associated data that is provided by a second provider that might not have any relation to the first provider. Changes may include the addition, deletion, rearrangement, or any other modification or combination thereof. Changes to the third party applications may be caused due to an automation that may be configured to run in the primary application. The automated changes may be driven by automation, which may include rule-based logical sentence structures and logical rules for configuring actions, as described above.

In some embodiments, the system may maintain in the primary application, a table having rows, columns, and cells at intersections of the rows and columns, wherein the primary application is configured to enable the construction of automations defined by conditional rules for altering internal information in the primary application and external information in the third party applications. Maintaining a table having rows, columns, and cells at intersection of the rows and columns may include storing or managing the storage of a table with structural components such as rows, columns, and cells and its associated data in a repository for later access and retrieval. A table may include a form, a sheet, a grid, a list, or any data presentation in horizontal and vertical dimensions (e.g., horizontal rows and vertical columns, horizontal rows and vertical rows, or horizontal columns and vertical columns). The table may be presented on a screen of a computing device (e.g., a personal computer, a tablet computer, a smartphone, or any electronic device having a screen, as previously described above). At least one table may be configured to operate within a primary application. For example, a user of the primary application may be able to view and manipulate the table within the primary application.

Construction of automations may include the establishment or generation of automations, as described above. The automations may be defined by conditional rules (e.g., rules that monitor a threshold, such as "if" and "when" logic) that when met, trigger an action. Conditional rules may be conditional on specific information input into at least one specific cell in the table of the primary application. Specific information input into at least one specific cell may include entering information into a cell. The information may include user input. The information may include free form text. The information may include one of a plurality of selectable options. For example, a user may change a value of a cell to one of a plurality of predefined options. In some embodiments, specific information input into at least one specific cell may include a status change, such as changing the content of a cell from "in progress" to either "stuck" or "done." A corresponding column for a status change may include a status column. In some embodiments, information may be entered into a cell automatically without direct user input. For example, a rule may be set up that automatically changes the contents of a cell in response to another cell changing.

Actions may include altering internal information, which may involve the addition, subtraction, rearrangement, or any other modification or combination thereof of data contained in a data object contained within a primary application (e.g., data internal to the primary application). The altering external information may include the addition, subtraction, rearrangement, or any other modification or combination thereof of data contained in a data object contained within a third party application (e.g., data external to the primary application). The primary application may be configured to enable the construction of automations defined by conditional rules. The primary application may allow the viewing and manipulation of information related to the table and may cause changes to the table. Meanwhile, third party applications may include external applications that may be unrelated to the table or other aspects of the primary application. The primary application may be linked with third party applications to enrich its functionality. The primary application may integrate functionality of third party applications and may communicate with the third party applications via links. The primary application may allow the viewing and manipulation of information related to third party applications.

A conditional rule may alter internal information in the primary application and external information in the third party applications. Alterations of internal information may include making changes to information maintained in the primary application. The primary application may maintain a table in the primary application, and the table may include rows, columns, and cells. Information in the cells may be added, deleted, or modified. Internal information of the primary application may include information that may not necessarily be contained in any particular cell. For example, internal information may include users associated with a table, dashboard, workspace, or any environment of the primary application. The users may include all available users that are associated with a project, even if some of those users have not yet been assigned to any particular task. Internal information may include metadata associated with data stored in the primary application. Internal information may include templates that may be used or stored in the primary application, such as custom recipe templates for creating an automation, workflow templates, choices for auto-filling lists (e.g., choices that automatically populate for column headings when creating a new column in a table), and any other customizable information associated with the primary application.

Alterations of external information may include making changes to information associated with third party applications. For example, a third party application may include a to-do list manager, and an alteration of external information in the third party applications may include adding, deleting, or editing a to-do item in a to-do list. Furthermore, for example, a third party application may include a blog host, and an alteration of external information in the third party applications may include posting a new blog article, deleting a blog article, or editing a blog article. Furthermore, for example, a third party application may include an email service, and an alteration of external information in the third party applications may include composing, deleting, or sending an email. Furthermore, for example, a third party application may include a file hosting service, and an alteration of external information in the third party applications may include adding a new file, deleting a file, editing a file, or editing information associated with the file, such as metadata. Furthermore, for example, a third party application may include a survey tool, and an alteration of external information in the third party applications may include adding a creating a new survey, deleting a survey, editing a survey, adding individual questions to a survey, adding or modifying a response to a survey question. As an example, a conditional rule may be conditional on information in a cell in a status column of a table of the primary application changing (e.g., changing from "in progress" to "done"), and the conditional rule may alter external information in third party applications including updating an answer to a survey question such as "is this task complete?" to "yes." The conditional rule may also alter internal information in the primary application such as changing information in another cell in a different column (e.g., in a column labeled "ready for next task?" adding the information "yes").

Conditional rules may alter internal information in the primary application together with altering external information in third party applications. In some embodiments, conditional rules may alter only internal information in the primary application or only external information in the third party applications. Conditional rules may be defined by the blocks, as described in further detail below, which may be configured to define changes to the primary application based on conditional data input in the third party applications. For example, a third party application (e.g., weather monitoring application) may receive a data input from a sensor that measures temperature. The primary application may have an associated automation with a conditional rule that is configured to define a change, such as a change in a status cell (e.g., below or above freezing temperature) in response to the data input from the third party application.

Figure 3:
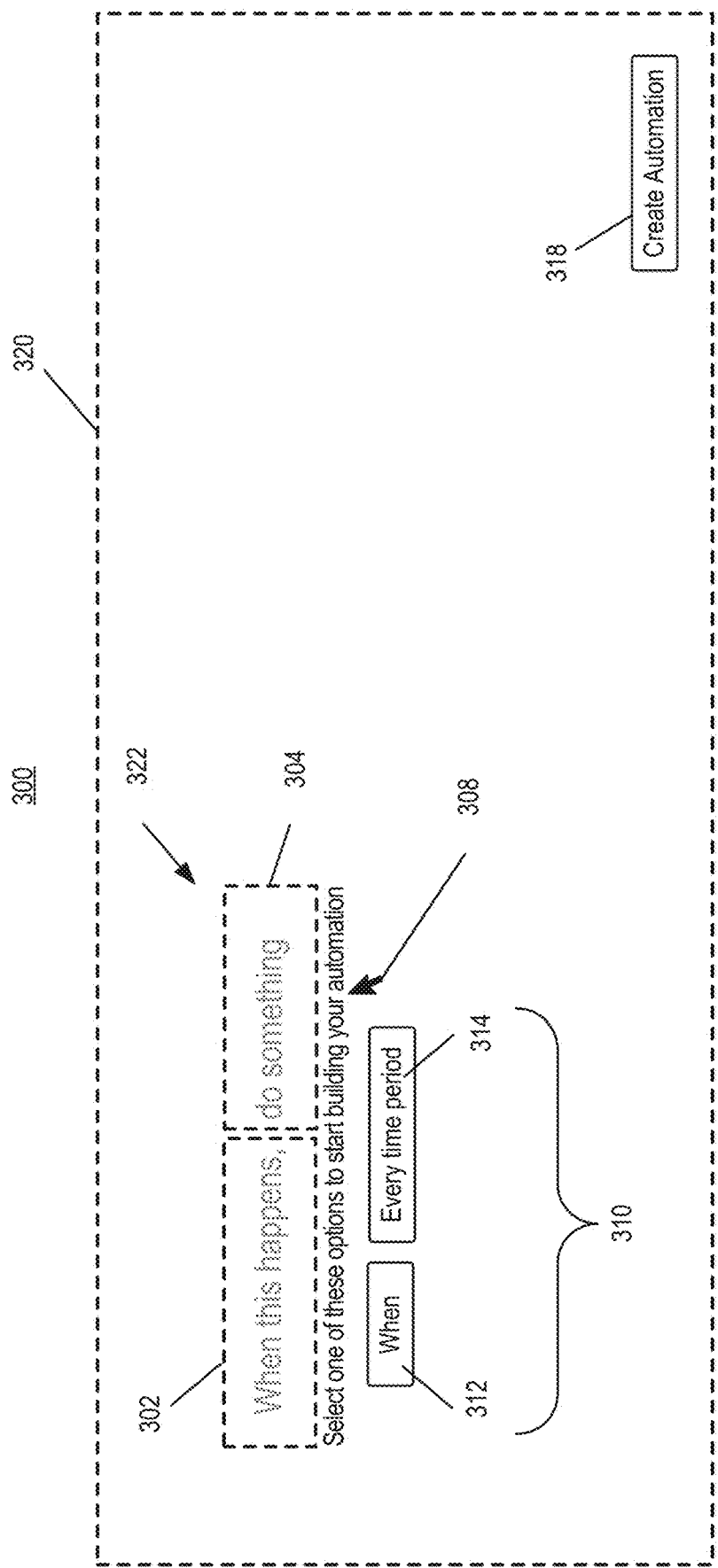
FIG. 3 illustrates an example of an automation definition in an intermediate stage of building an automation, consistent with some embodiments of the present disclosure.

With reference to FIG. 3, conditional rule 322 may include a condition 302 and an action 304. Condition 302 may include an event. Condition 302 may include events associated with the primary application or third party applications. Condition 302 may also include events that are not related to the primary application or third party applications. Action 304 may include functions that are executed by a processor. Conditional rule 322 may be configured such that action 304 occurs in response to condition 302 being satisfied. At an intermediate stage of building conditional rule 322, graphical user interface 320 may display temporary text such as "when this happens" in a region of condition 302 and "do something" may be displayed in a region of action 322. The temporary text may guide a user to build the automation without needing programming knowledge.

Some embodiments may include receiving an automation definition conditional on specific information input into at least one specific cell in the table of the primary application. Receiving an automation definition conditional on specific information input may include receiving a signal from a user interface (e.g., a mouse, keyboard, touchscreen, and so on) to indicate an intent to provide definition to an automation based on information input from a specific source. The specific source may be associated with a specific cell of a table in the primary application that may contain static information, or may include dynamic information that may be updated from external sources.

In some disclosed embodiments, the automation definition may be constructed using internal blocks and external blocks, the external blocks having links to the external third party applications. Automations may be displayed in an accessible way such that a user that does not necessarily have programming experience is enabled to construct an automation using selectable blocks. A user may select from a plurality of blocks that have instantly recognizable functions to configure an automation or otherwise provide an automation definition. Automations may be configured using both internal and external blocks to provide an automation definition. A block may include a programming unit that may act as a basic building block for constructing an automation. Blocks may include building blocks that are used to construct an automation definition. Blocks may be the most basic editable unit that may be manipulated by a user to form an automation definition in a format intelligible to the user. Blocks may have structure and may be associated with particular aspects of operation of the primary application or third party applications. Blocks may be associated with the primary application (e.g., an internal block) or third party applications (e.g., an external block). For example, there may be internal blocks that are associated with functions of the primary application such as tables, and external blocks that are associated with functions of external applications such as email, video conferencing, chatting, or any other platform. An external block may be said to be linked to external third party applications because the link may be activated to access and/or transmit information to external third party applications.

Figure 5:
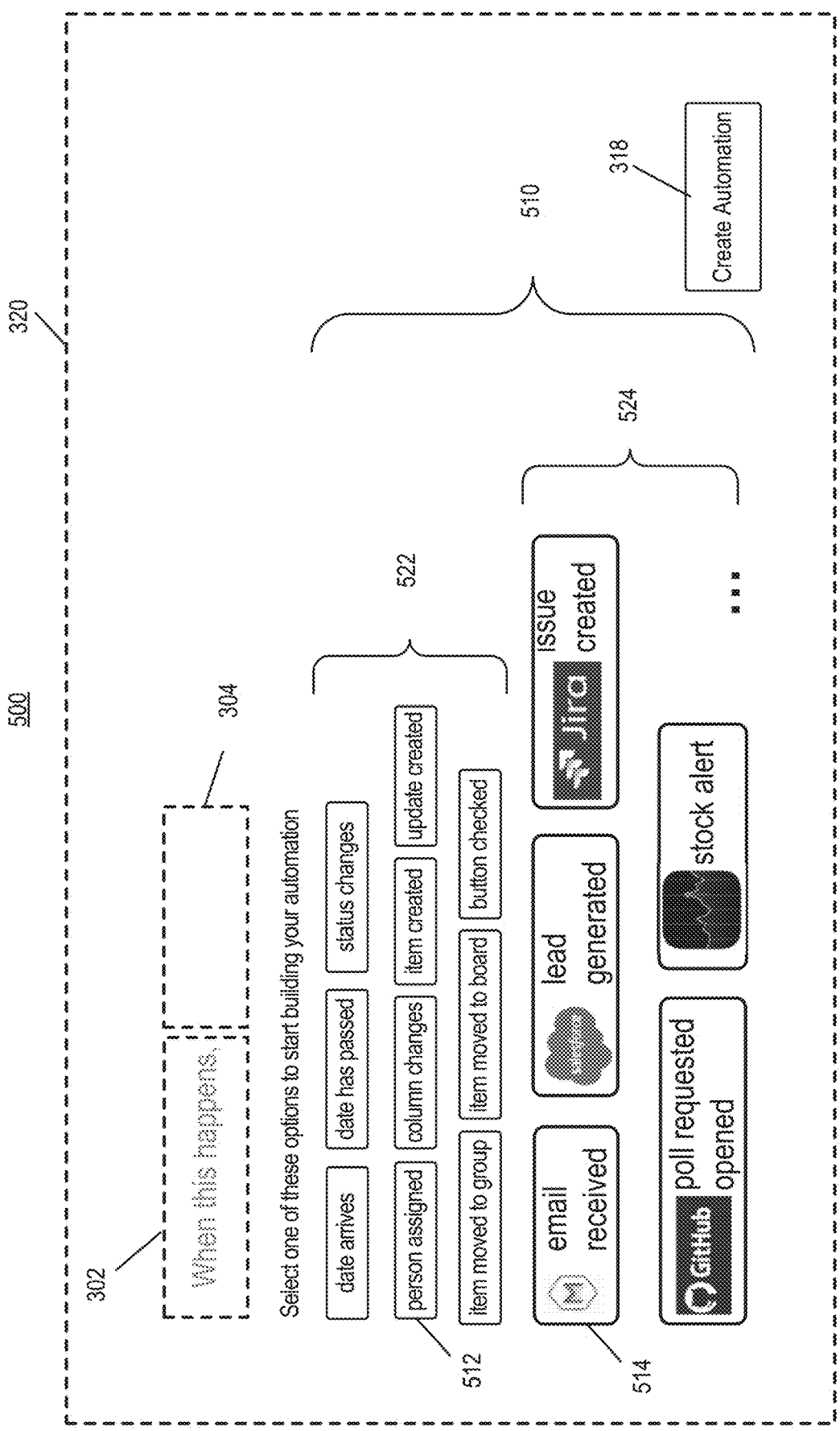
FIG. 5 illustrates an example of an automation definition in an intermediate stage of building an automation, consistent with some embodiments of the present disclosure.

As shown in FIG. 5, detailed blocks 510 may include internal blocks 522 and external blocks 524. Internal blocks 522 may be associated with aspects of the primary application. External blocks 524 may be associated with third party applications. For example, a block 514 may be provided that is associated with an email application. Selection of block 514 may enable input options for further configuring aspects of the associated third party application, such as which account is used to login, what action is used as a trigger (e.g., receiving an email, receiving an email from a particular entity, sending an email, or any other functionality particular to the third party application). Although external blocks may be associated with third party applications, they may be presented in the primary application and may be used for altering external information in the third party applications.

Automations may include predefined automation categories (e.g., static recipes) and user-defined categories (e.g., custom recipes). Predefined automation categories may be set in advance and may include, for example, commonly used categories of automations or categories expected to be highly used. Predefined automation categories may include status change, notification, recurring, item creation, and due date automations. Predefined automation categories may include certain blocks arranged in a predefined order. For example, a predefined notification automation may include a recipe of "when a column changes, notify someone." Blocks making up such an automation may include "column" and "notify." While a user may be able to customize the automation by, for example, modifying which column changes, and who to notify, the basic structure of the automation may be unchangeable in some embodiments. In such automation, the blocks may remain in set positions. A user-defined automation, on the other hand, may allow a user to build an automation from scratch using their own selection of blocks. User-defined automations may grant a user broad flexibility to configure automations. A user may have the ability to build an automation that performs a broad range of desired functions, using a variety of applications including external platforms, in a user-friendly intuitive interface that does not require programming knowledge.

Automations may be configured to occur autonomously. Automations may occur without human intervention after they are set up. For example, an automation may be created that is configured to perform an action upon occurrence of a condition. After the automation is created, the action may be performed automatically upon occurrence of the condition. The condition may include an event. Automations may be linked to an environment, such as a board.

Blocks may be used for both conditions and actions. A variety of configurations may be used. For example, an automation may be configured to use an internal block as a condition, and an external block as an action. An automation may be configured to use an external block as a condition, and an internal block as an action. There may be multiple blocks on the condition side and multiple blocks on the action side of the automation. Any combination of internal and external blocks may be used. For example, an automation may be configured to cause an action using internal blocks or external blocks, upon occurrence of a condition using internal blocks or external blocks.

FIG. 3 illustrates an example of an automation definition 300 in an intermediate stage of building an automation, consistent with embodiments of the disclosure. Automation definition 300 is in a stage of beginning to build an automation. As illustrated in FIG. 3, a graphical user interface 320 may be provided. Graphical user interface 320 may include a button 318 for completing an automation, upon which a finished automation may be put into service. In graphical user interface 320, a conditional rule 322 may be displayed that may be a graphical representation of an automation. Conditional rule 322 may be configured as a semantic statement (e.g., a sentence) that is intelligible to a human user. Conditional rule 322 may be configured so that an action is executed in response to a condition being met. The condition may include an event that may occur with respect to a primary application or a third party application. A processor may be configured to maintain a table in the primary application. The processor may be configured to perform various functions that are based on conditional rules, such as conditional rule 322. Upon a condition of conditional rule 322 being met, an action may occur. The processor may cause the action to occur. The processor may execute computer-readable instructions that may set into motion a process for causing the action to occur.

As shown in FIG. 3, a cursor 308 may be displayed in graphical user interface 320. Cursor 308 may be used for user input. Cursor 308 may hover over different regions of graphical user interface 320 and changes may occur in graphical user interface 320 in response to cursor 308 hovering over particular regions.

Figure 4:
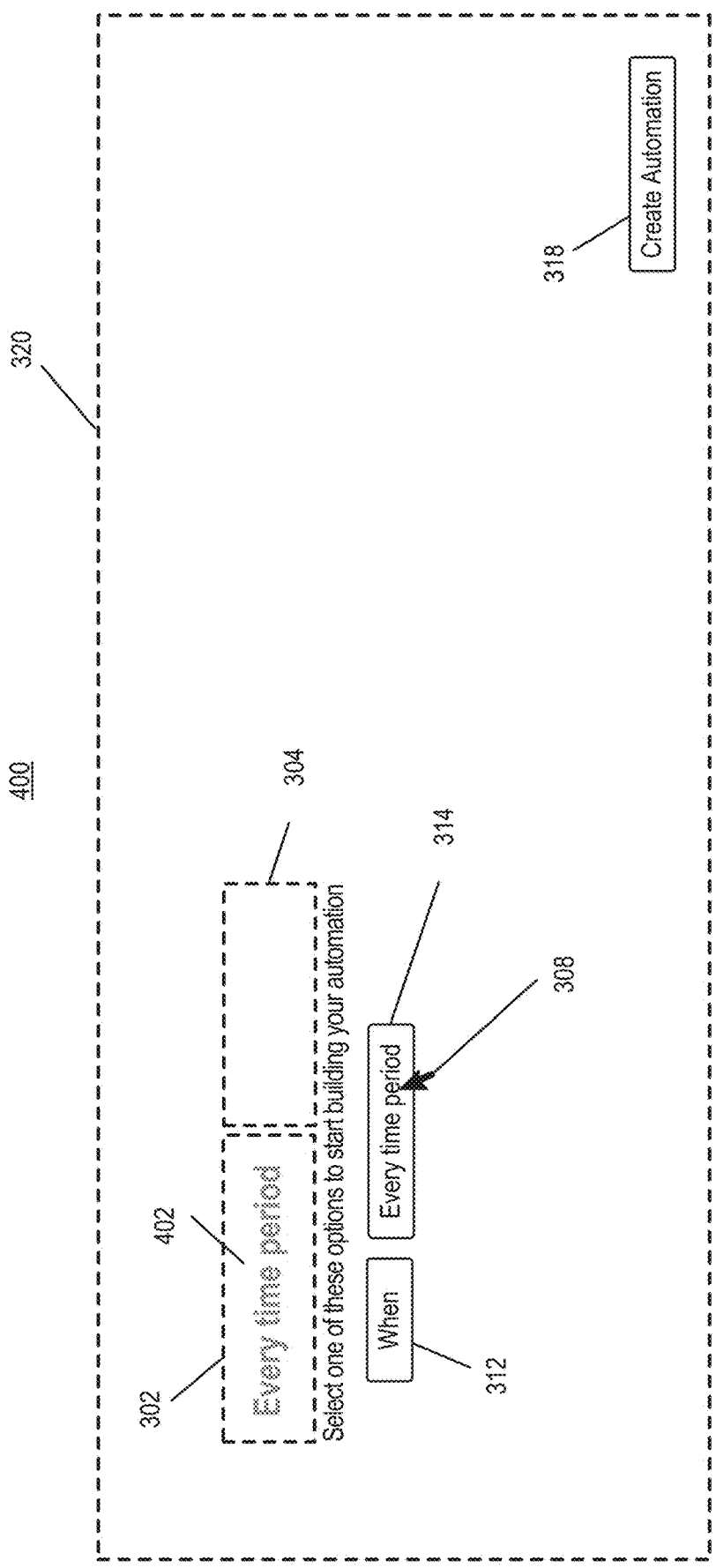
FIG. 4 illustrates an example of an automation definition in an intermediate stage of building an automation, consistent with some embodiments of the present disclosure.

FIG. 4 illustrates an example of an automation definition 400 in an intermediate stage of building an automation, consistent with embodiments of the disclosure. Automation definition 400 is in a stage of continuing to build an automation. As illustrated in FIG. 4, cursor 308 may hover over second block 314. Upon hovering over second block 314, temporary text in a region of condition 302 may change. For example, upon cursor 308 reaching second block 314, temporal condition 402 may be displayed in a region of condition 302 with the text "every time period." Graphical display of automation definition 400 may change in real time as a user manipulates options in graphical user interface 320. A user may be guided by changes in graphical display of automation definition 400 as an automation is being built. Graphical display may include a preview mode. As shown in FIG. 4, a preview of an automation may be shown wherein only a part of automation definition 400 is visible in graphical form. Condition 302 may be displayed, while action 304 is suppressed. Suppressing part of automation definition 400 may simplify a construction process for a user. Upon a user input, for example, clicking of second block 314 using cursor 308, further changes may be caused in graphical display of automation definition 400.

FIG. 5 illustrates an example of an automation definition 500 in an intermediate stage of building an automation, consistent with some embodiments of the disclosure. With reference to both FIGS. 4 and 5, automation definition 500 is in a stage of continuing to build an automation upon first block 312 being clicked using cursor 308 (see FIG. 4). As illustrated in FIG. 5, a variety of options become available and are displayed. Upon clicking first block 308, first block 308 may disappear and detailed blocks 510 may appear. Detailed blocks 510 may include a plurality of internal or external blocks. An internal block may be associated with the primary application. An external block may be associated with a third party application. Additionally, blocks that are not associated with the primary application or any third party application may be displayed. A block 506 may display "date arrives" and may be related to temporal information. In some embodiments, internal blocks may be related to aspects of a table of the primary application, such as rows or columns. An example of an internal block may include a block 508 that displays "column changes." Block 508 may be related to information included in a column of a table of the primary application. Furthermore, there may be a block 512 that displays "person assigned." Block 512 may be related to a person column of a table of the primary application. Block 512 may be related to a condition that when the contents of a cell in a person column is filled with an item (e.g., a person is assigned to a task), the condition is satisfied.

Figure 6:
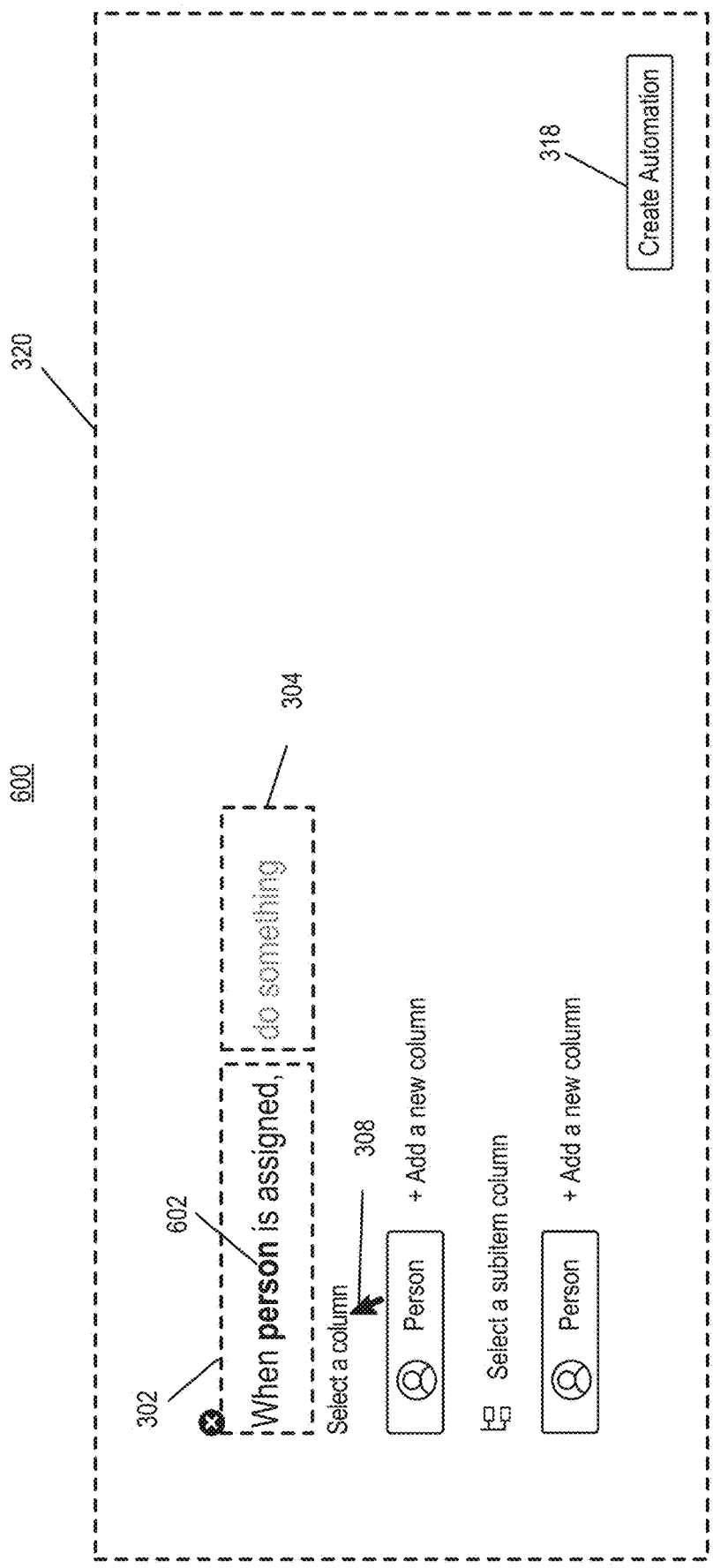
FIG. 6 illustrates an example of an automation definition in an intermediate stage of building an automation, consistent with some embodiments of the present disclosure.

FIG. 6 illustrates an example of an automation definition 600 in an intermediate stage of building an automation, consistent with embodiments of the disclosure. Automation definition 600 is in a stage of continuing to build an automation upon selecting block 512 using cursor 308. As illustrated in FIG. 6, a variety of options may become available and are displayed. Detailed manipulation of automation definition 600 may be enabled. Upon clicking block 512 (labeled "person assigned") in FIG. 5, block 512 may disappear and detailed options may appear. Condition 302 may display text corresponding to block 512 that was selected, while action 304 is suppressed. Condition 302 may include a parameter 602. Parameter 602 may be displayed in a manner different from that of surrounding text. Parameter 602 may be modifiable based on specific information. For example, parameter 602 may be selected using cursor 308 and further detailed options may appear. Upon selecting parameter 602, specific information may be input, such as a specific person among a list of persons. The list of persons may include team members added to a board. Upon selecting a specific person, condition 302 may be configured so as to be satisfied upon the specific person being assigned.

Additionally, as shown in FIG. 6, action 304 may display temporary text such as "do something." Although not a requirement, in some embodiments, condition 302 and action 304 may be displayed in an upper region of graphical user interface 320. Meanwhile, in a lower region of graphical user interface 320, options available for modifying of parameter 602 may be displayed. Changing between different input types may also be enabled. For example, although block 512 (labeled "person assigned") may have been selected, and options relating to a person column may be displayed, it may be possible to change to a different column, such as a status column. Furthermore, options such as "Add a new column" may be displayed, which may allow a user to add a new column to a table of the primary application directly from graphical user interface 320. A user may be able to make changes to a table of the primary application while in a state of constructing an automation definition, rather than, for example, exiting graphical user interface 320 and editing a table after entering a view of the table.

Figure 7:
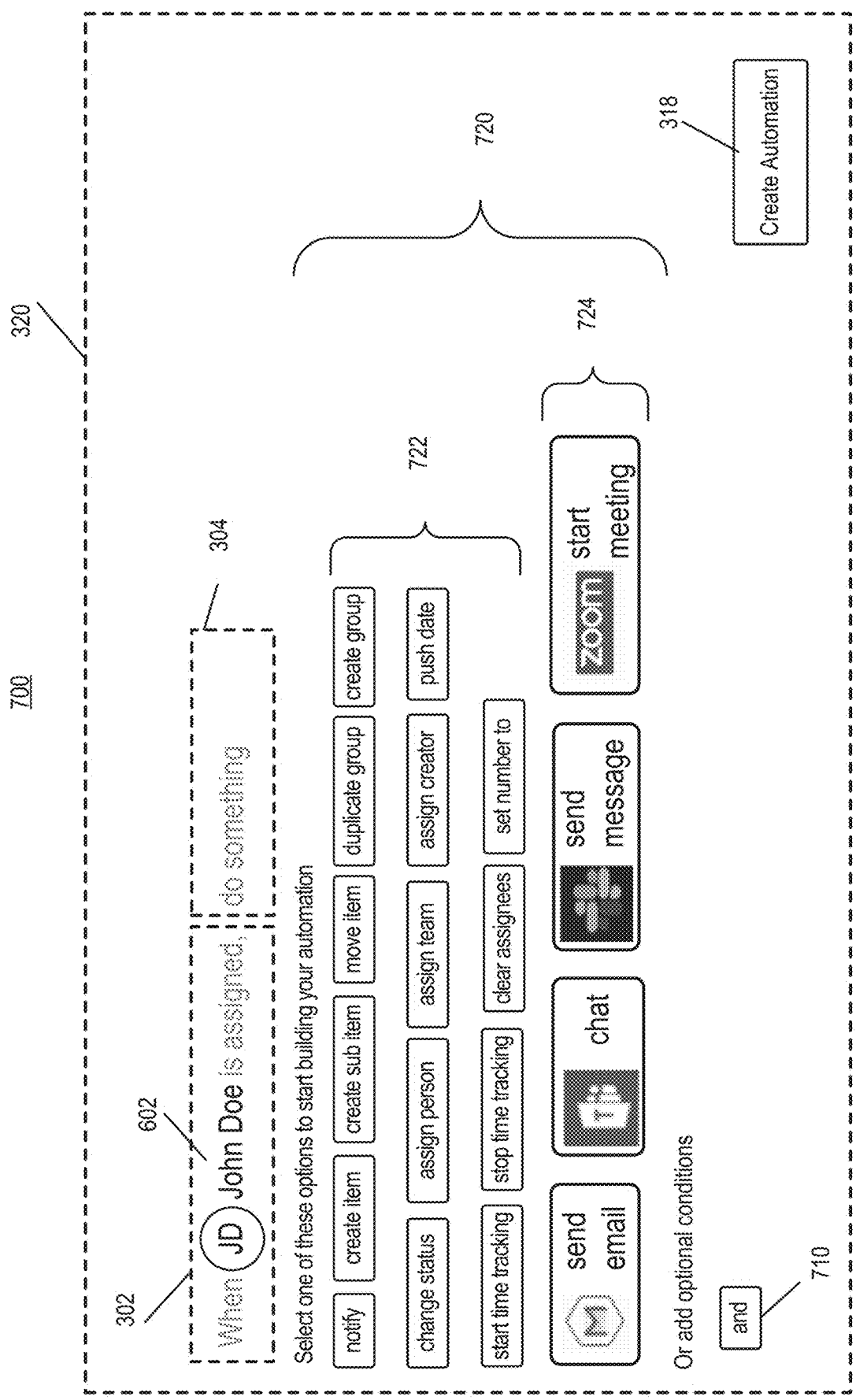
FIG. 7 illustrates an example of an automation definition in an intermediate stage of building an automation, consistent with some embodiments of the present disclosure.

FIG. 7 illustrates an example of an automation definition 700 in an intermediate stage of building an automation, consistent with embodiments of the disclosure. Automation definition 700 is in a stage of continuing to build an automation upon selecting block an available choice for parameter 602 using cursor 308. As shown in FIG. 7, parameter 602 may be changed to a specific person, e.g., John Doe. Automation definition 700 may monitor a cell of a table of the primary application for occurrence of specific information such as the specific person John Doe being assigned. Multiple cells may be monitored, such as a column of cells. After selection of an available choice for parameter 602, condition 302 may be complete. Next, a selection of blocks for actions may be enabled.

As shown in FIG. 7, action blocks 720 may be displayed in a lower region of graphical user interface 320. Action 304 may be constructed using action blocks 720. Action blocks 720 may include internal blocks and external blocks. For example, FIG. 7 shows action blocks 720 that include internal blocks 722 and external blocks 724.

According to an automation definition, action 304 may be triggered upon satisfaction of condition 302. As shown in FIG. 7, according to automation definition 700, action 304 may be triggered upon satisfaction of the condition that John Doe is assigned. When action 304 is constructed using external blocks, functionality of third party applications may be triggered upon satisfaction of condition 302.

Various parts of an automation definition may include one or more blocks. Condition 302 may include multiple blocks. As shown in FIG. 7, a connector 710 may be provided. Connector 710 may be used for adding additional blocks to parts of an automation definition. In the state shown in FIG. 7, graphical user interface 320 may display options relating to condition 302. Connector 710 may be associated with condition 302. Connector 710 may be used to add more blocks to condition 302. Connector 710 may include conjunctive terms, such as "and" or "or." Conditions may be formed having multiple components, and the condition may be satisfied in accordance with the conjunctive terms used. For example, a condition may be constructed such as "when event A occurs, and when event B occurs, . . . " and such condition may be satisfied when both events A and B occur. In some embodiments, a condition may be constructed such as "when event A occurs, or when event B occurs, . . . " and such condition may be satisfied when either event A or B occurs. Further conductive terms may be added, and various permutations may be possible.

Figure 8:
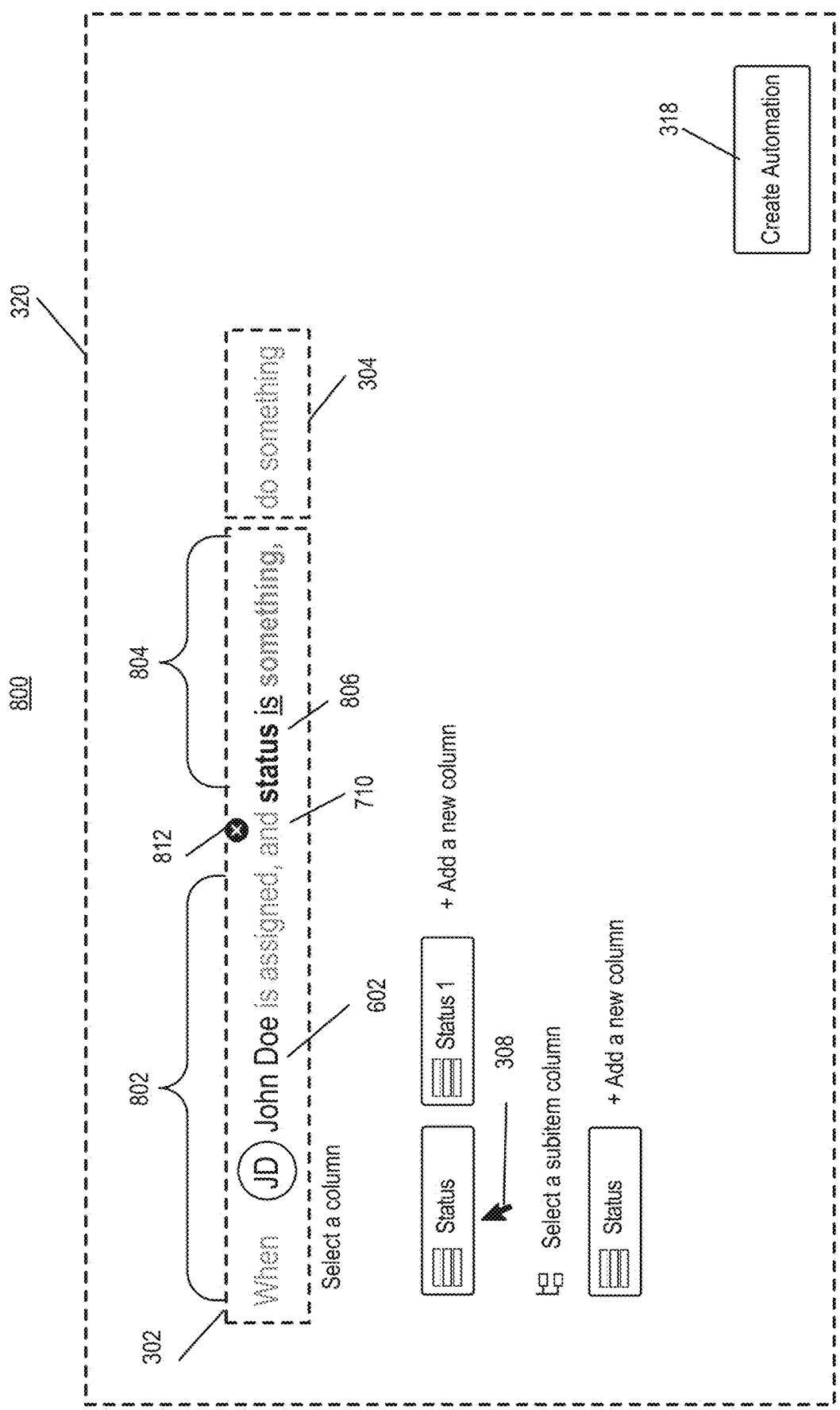
FIG. 8 illustrates an example of an automation definition in an intermediate stage of building an automation, consistent with some embodiments of the present disclosure.

FIG. 8 illustrates an example of an automation definition 800 in an intermediate stage of building an automation, consistent with embodiments of the disclosure. Automation definition 800 is in a stage of continuing to build an automation upon adding additional conditions to an automation definition. Additional conditions may be added by selecting connector 710 using cursor 308. As shown in FIG. 8, connector 710 may be added to condition 302. Condition 302 may include a first condition 802 and a second condition 804. A process for constructing first condition 802 and second condition 804 may be similar. For example, for second condition 804, temporary text such as "status is something" may be displayed in graphical user interface 320. Also, in a lower region of graphical user interface 320, options for customizing second condition 804 may be displayed. The options may include blocks. The options for customizing second condition 804 may be related to a parameter 806 of second condition 804. For example, second condition 804 may be based on a status column of a table of the primary application, and internal blocks may be displayed that are related to parameter 806 that may correspond to a particular column of a table of the primary application. Second condition 804 may be removed using deletion button 812.

Figure 9:
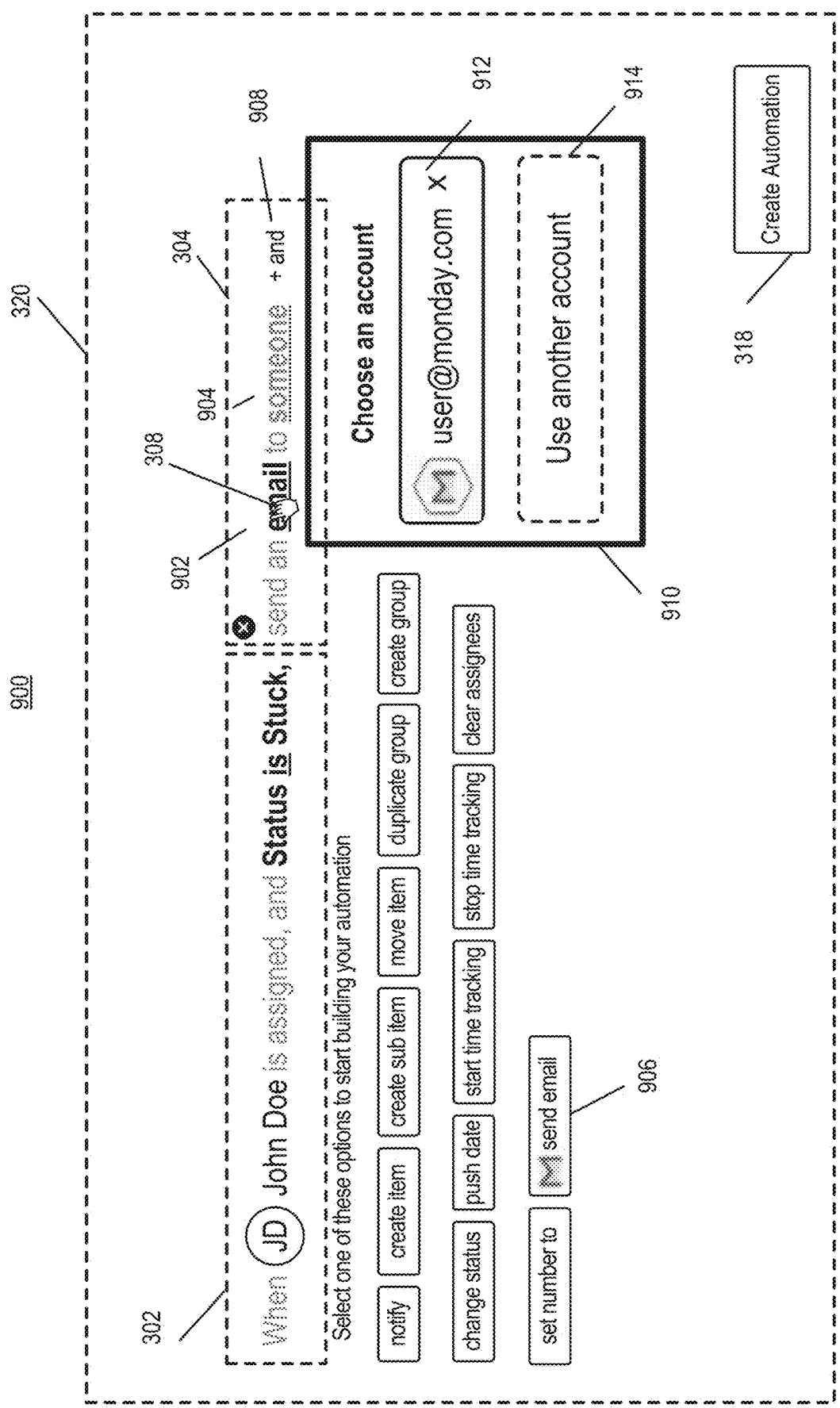
FIG. 9 illustrates an example of an automation definition in an intermediate stage of building an automation, consistent with some embodiments of the present disclosure.

FIG. 9 illustrates an example of an automation definition 900 in an intermediate stage of building an automation, consistent with embodiments of the disclosure. Automation definition 900 is in a stage of continuing to build an automation upon completing condition 302 with multiple conditions, and beginning to define action 304. Blocks may be displayed in a lower region of graphical user interface 320. Although features (e.g., blocks and any other feature) of a graphical user interface are described as being displayed in specific regions (e.g., top, bottom, and so on) of the GUI, this is only exemplary and persons skilled in the art would recognize that these features may, in general, be displayed in any region of the GUI. Among the blocks, an external block may be provided, such as a block for sending an email using a third party email application. As shown in FIG. 9, automation definition 900 may be constructed using two internal blocks, including (i) a person being assigned in the primary application and (ii) a status being stuck, and one external block including sending an email using a third party application. Additional actions may be added by selecting connector 908 using cursor 308.

In automation definition 900, action 304 includes a first action 902 of sending an email. First action 902 may be customized based on the particular third party application involved. Action 304 may be constructed using block 906. Further blocks may be provided in graphical user interface 320, including external blocks. When an external block is used such as a meeting application, first action 902 may include an action such as scheduling a meeting. Various actions may be selectable, such as starting a meeting, inviting a user in the third party application to join a meeting, sending a reminder regarding a meeting, or any other actions based on the functionality of the third party applications. First action 902 may include parameters, such as first parameter 904. When first action 902 is based on a third party email application, first parameter 904 may include a recipient of an email to be sent using the third party email application.

Some embodiments may include monitoring the at least one specific cell of the primary application for an occurrence of a specific information. Monitoring may include checking (e.g., a continuous or partially continuous checking) of information contained in a data object such as a specific cell, or any other data object such as a column, table, or information across multiple tables. Monitoring a specific cell for an occurrence of a specific information may include checking the data contained in a specific cell for when the data in the specific meets a certain criteria or condition. The specific cell may contain information that is internal to the primary application, or the specific cell may be a cell in the primary application that may be linked to the third party applications in a manner permitting the primary application to monitor data input in the third party application. A manner permitting the primary application to monitor data input in the third party application may include any method of providing the primary application with access to data in a third party application either in completely open access manners or in other manners that may provide restrictions requiring authentications. The primary application may be linked to the third party applications using a connection protocol. For example, a request may be sent to a third party application. The request may include a login request wherein a user inputs an identifier and login credentials. The identifier may include a username and the login credentials may include a password. An authentication process (e.g., a handshake) may occur based on the request. Authentication may include comparing the identifier and login credentials to a database. Upon a successful authentication, an access token may be returned. The primary application may receive the access token and store it. The primary application may include an access token vault. Linking of the primary application to the third party applications may be accomplished using, for example, an Application Programing Interface (API).

Internal blocks may be related to a table of the primary application. A table of the primary application may include cells. An automation definition may be set up that monitors a specific cell among the cells. For example, the automation definition may monitor one cell that is at the intersection of a particular row and column. In some embodiments, the automation definition may monitor multiple cells. In some embodiments, the automation definition may monitor a whole column or row, multiple columns or rows, or a portion of a column or row. The automation definition may monitor for an occurrence of specific information in a cell. Specific information may include data in the at least one specific cell. Specific information may include predetermined information. For example, an automation definition may monitor a status column for occurrence of a "stuck" status occurring among an entire column. When status becomes "stuck" for one or more rows, a condition of the automation definition may be met.

In some embodiments, monitoring the at least one specific cell of the primary application for an occurrence of the specific information may include monitoring for an event. Blocks may be configured to represent the event by defining a condition. For example, with reference to FIG. 4, first block 312 may be configured to represent an event in which specific information is input into the at least one specific cell. Details of which event may be further defined by detailed blocks, such as detailed blocks 510. Further details of the event may be further defined by more detailed blocks.

A conditional rule 322 may be conditional on an event occurring that is related to the primary application or third party applications, as discussed above. The event may include the occurrence of specific information being input into at least one specific cell. The event may include the occurrence of events that are specific to a third party application. A block may be used to reflect the occurrence of events. For example, as shown in FIG. 3, a first block 312 and a second block 314 may be provided. First block 312 may be labeled "when" and second block 314 may be labeled "every time period." First block 312 may be configured to represent an event in which specific information is input into the at least one specific cell. First block 312 may also be configured to represent events associated with third party applications. Second block 308 may be configured to represent an event occurring based on time. For example, second block 308 may represent a condition that is satisfied upon a regularly recurring time period, such as daily, weekly, monthly, or any other defined time period. Time periods of second block 308 may be relative to a defined time point, such as a particular start date.

Figure 10:
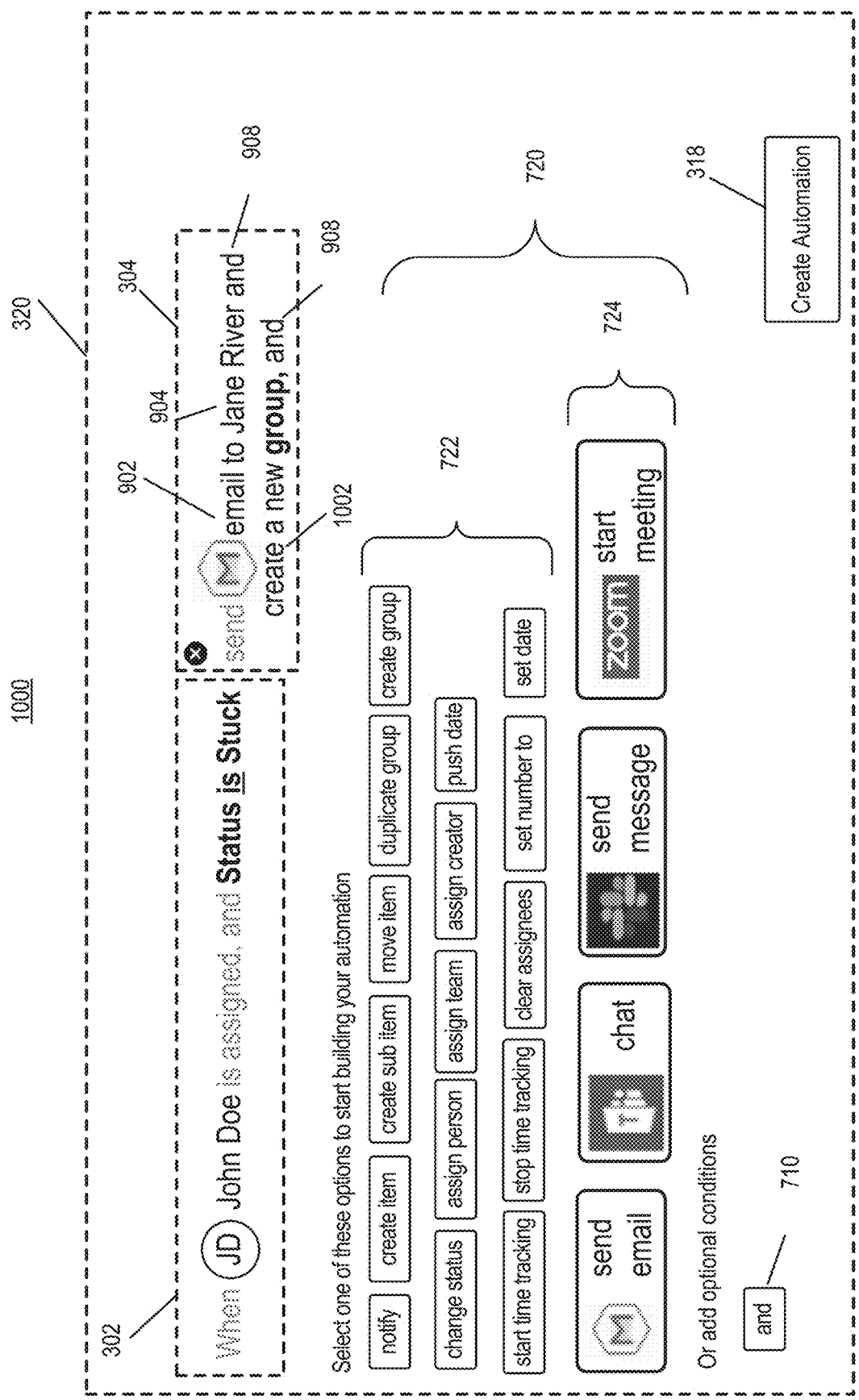
FIG. 10 illustrates an example of an automation definition in an intermediate stage of building an automation, consistent with some embodiments of the present disclosure.

In some embodiments, an automation definition may include conditional rules that define changes to the primary application based on conditional data input in third party applications. For example, condition 302 may include conditions that are based on external blocks, such as receiving an email in a third party email application. Upon receiving an email, changes to the primary application may be triggered. For example, as shown in FIG. 10, action 1002 may include second action 1002 that causes changes to the primary application. In the example of FIG. 10, the changes to the primary application may include creating a new group in the primary application. Conditional rules may be constructed that are based on functionality of the third party applications. A rule may specify, for example, that a condition is met when conditional data is input in a third party application. The conditional data may include receiving an email. The third party application may be linked with the primary application such that the primary application monitors for the conditional data being input in the third party application. In some embodiments, the third party application may be linked with the primary application such that another entity monitors for the conditional data being input in the third party application and sends a signal to the primary application indicating that the condition has been met. The primary application may be linked to the third party application using, for example, customizable object 910 discussed above with reference to FIG. 9.

The primary application may be linked to the third party applications in a manner permitting the primary application to monitor data input in the third party application. The primary application may be linked to the third party applications using a connection protocol that may be implemented through customizable object 910. For example, referring to FIG. 9, a user may select address 912 and a request may be sent to a third party application to login using address 912. The request may include a login request wherein a user inputs an identifier (e.g., a username) and login credentials (e.g., a password). An authentication process (e.g., a handshake) may occur based on the request. Authentication may include comparing the identifier and login credentials to a database and may be performed by the third party application. Upon a successful authentication, an access token may be returned to the primary application. The primary application may receive the access token and store it. The primary application may include an access token vault. Linking of the primary application to the third party applications may be accomplished using an Application Programing Interface (API).

The primary application may be linked to the third party applications and may monitor for a specific event or information occurring with respect to the primary application or a third party application. In some embodiments, upon detection of the occurrence of the specific information, the system may trigger functionality of the third party applications or any other various actions. Triggering functionality may include sending a signal that may activate operations to carry out functionality of an application or any other workflow. For example, functionality of the third party application may be triggered even though the detection of the occurrence of the specific information occurs in the primary application. In this example, the primary application may output an activation signal that may be transmitted to a linked, third party application to cause the third party application to activate and carry out operations. In some embodiments, functionality of the primary application may be triggered. As one example, an external block for a third party email application may be used and the primary application may monitor for reception of an email from the third party email application.

In some embodiments, an automation may be configured to use external blocks along with at least one internal block. The internal block may be on the condition side or the action side of an automation. For example, an automation may be configured such that upon occurrence of a condition using an internal block, an action is triggered using an external block. The action may cause changes to a third party application associated with the external block. Changes to the third party application may include altering external information in the third party application. For example, the third party application may include a to-do list manager, and a change to the third party application may include adding, deleting, or editing a to-do item in a to-do list. The action may also cause changes to the primary application that may include altering internal information in the primary application. For example, the primary application may use a table with rows, columns, and cells at intersections of the rows and columns, and changes to the primary application may include adding, deleting, or editing data in a cell.

Changes to a third party application may be caused using the primary application. A change to a third party application may include triggering functionality of the third party application. As shown in FIG. 9, graphical user interface 320 may display a customizable object 910 for customizing aspects of first action 902. Customizable object 910 may be used to link the primary application to the third party application. Customizable object 910 may include a login prompt that may present options for a user to login to various accounts using the third party application. Customizable object 910 may be populated using information from the third party applications or the primary application. For example, the primary application may store user preferences for the user using the primary application and who may be constructing automation definition 900. The user using the primary application may have a default email address associated with a third party application. Customizable object 910 may include default address 912. Customizable object 910 may include an option 914 for adding additional accounts. Upon selecting option 914, a user may input further accounts associated with the third party application. Added accounts may be saved in the primary application. Customizable object 910 may enable a login operation that may involve authentication with the third party application. Upon logging in with a particular account associated with the third party application, automation definition 900 may be configured to use the account of the third party application to trigger functionality of the third party application. For example, an email may be sent using the account associated with the third party application. Other changes to third party applications may include posting an article on a third party blog application, sending a message through a third party messenger application, altering a to-do item in a to-do list manager application, or implementing any other functions of third party applications.

FIG. 10 illustrates an example of an automation definition 1000 in an intermediate stage of building an automation, consistent with embodiments of the disclosure. Automation definition 1000 is in a stage of continuing to build an automation upon adding multiple actions in action 304. As shown in FIG. 10, action 304 may include first action 902 and a second action 1002. First action 902 may be customized by defining first parameter 904 as a particular recipient. Connector 908 may be used to connect second action 1002 with first action 902. Connector 908 may include an "and" conjunction or other logical operator.

Action 304 may be constructed using blocks, including internal blocks or external blocks. Second action 1002 may be associated with an internal block. For example, second action 1002 may be related to a group function of the primary application. Second action 1002 may cause a new group to be formed. A group may be formed in the primary application that is associated with particular users in the primary application.

Figure 11:
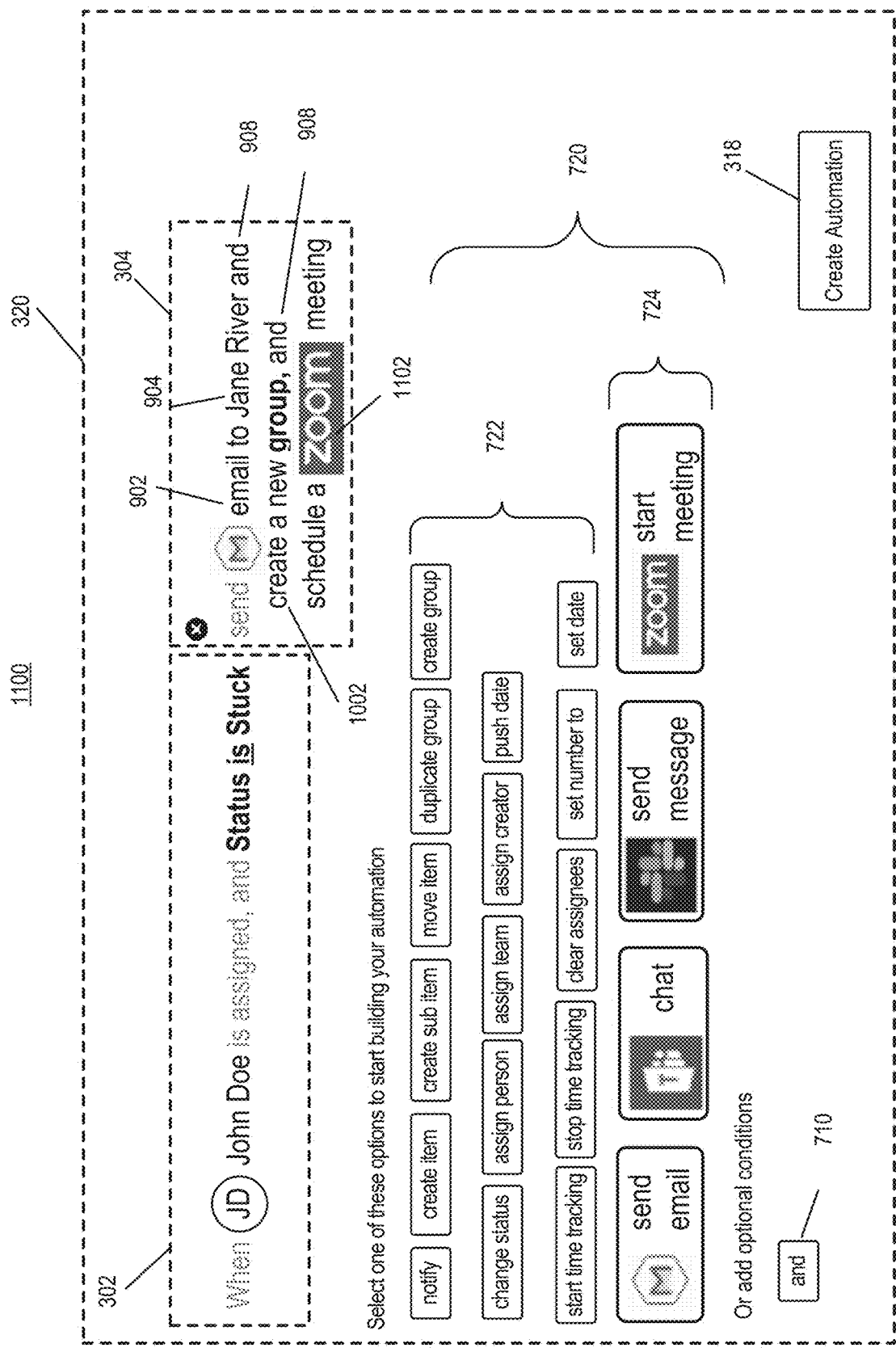
FIG. 11 illustrates an example of an automation definition in final stage of building an automation, consistent with some embodiments of the present disclosure.

In the state shown in FIG. 11, graphical user interface 320 may display additional options for further editing automation definition 1100. Although each of condition 302 and action 304 include multiple conditions or actions, further conditions or actions may be added. As shown in FIG. 11, graphical user interface 320 may include action blocks 720. Action blocks 720 may be used to add further actions to action 304. Additionally, connector 710 may be displayed that may be used to add additional conditions to condition 302.

When automation definition 1100 is constructed to a user's satisfaction, the user may select button 318 to generate the automation and place it into service. The automation may be made active and may constantly run in the background of the primary application. The automation may continue running even when a user is not actively using the primary application. Even when an automation definition is in an intermediate stage of construction, a user may select button 318 to finalize the automation. However, if certain parameters of the automation definition are left undefined, the user may be prompted to enter user input for fully defining the automation definition.

Figure 12:
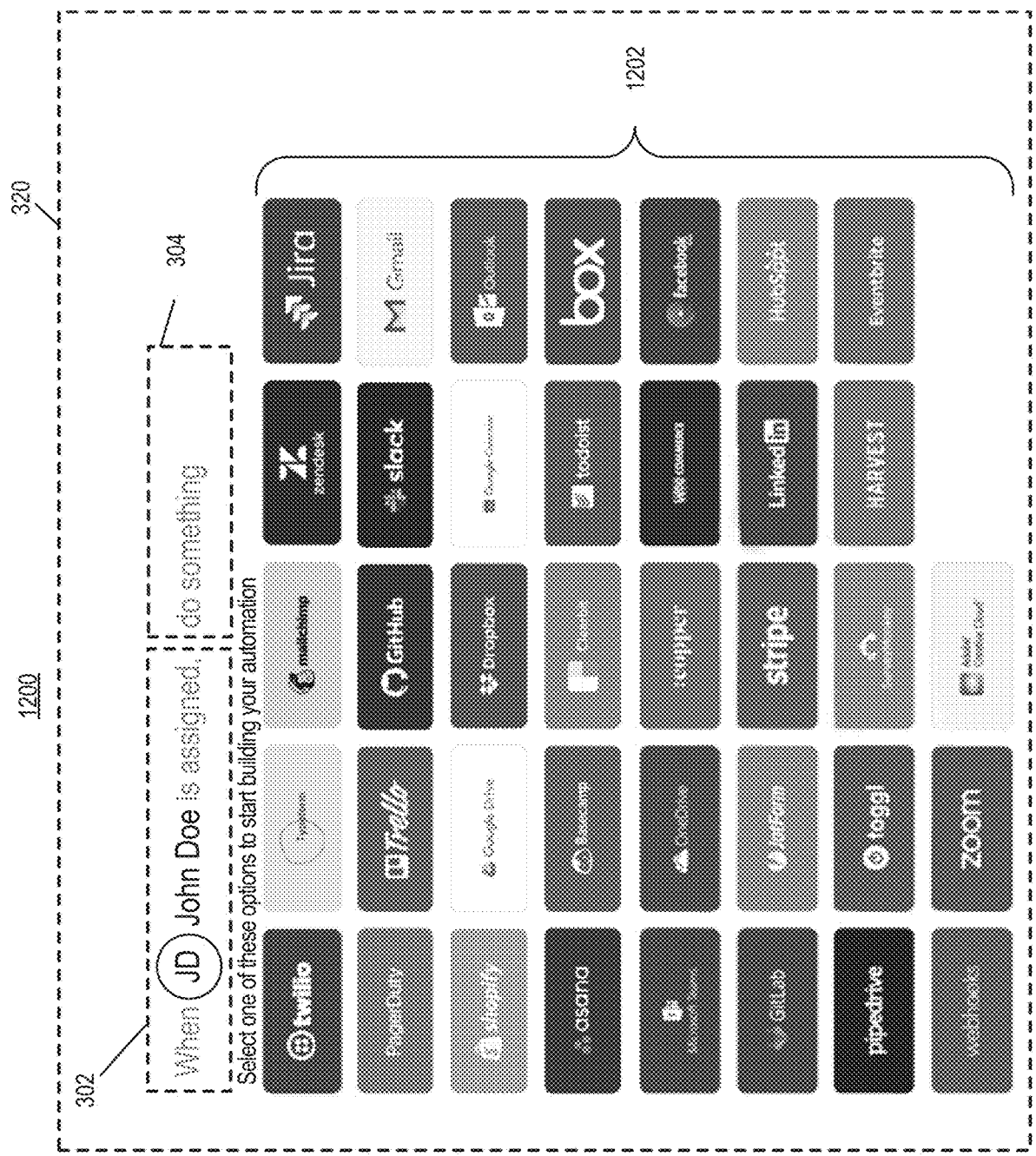
FIG. 12 illustrates an example of an automation definition in an intermediate stage of building an automation, consistent with some embodiments of the present disclosure.

FIG. 12 illustrates an example of an automation definition 1200 in an intermediate stage of building an automation, consistent with embodiments of the disclosure. Automation definition 1200 is in a stage of building an automation upon defining a condition for condition 302, and in which a user is to select among various external blocks for defining an action for action 304. Graphical user interface 320 may include external blocks 1202. Blocks 1201 may be arranged by third party application. Each of the blocks among blocks 1201 may include a logo corresponding to the particular third party application whose functionality is involved in the particular block. Upon selecting an individual block, further options may be displayed. For example, upon selecting a file sharing block, such as that labeled "box," options for further defining an action using the block may be presented. Such options may include uploading a file, deleting a file, altering a file (such as altering the contents or metadata of a file), sending a link to a file hosted by the third party application, or any other function enabled by the third party application.

Figure 13:
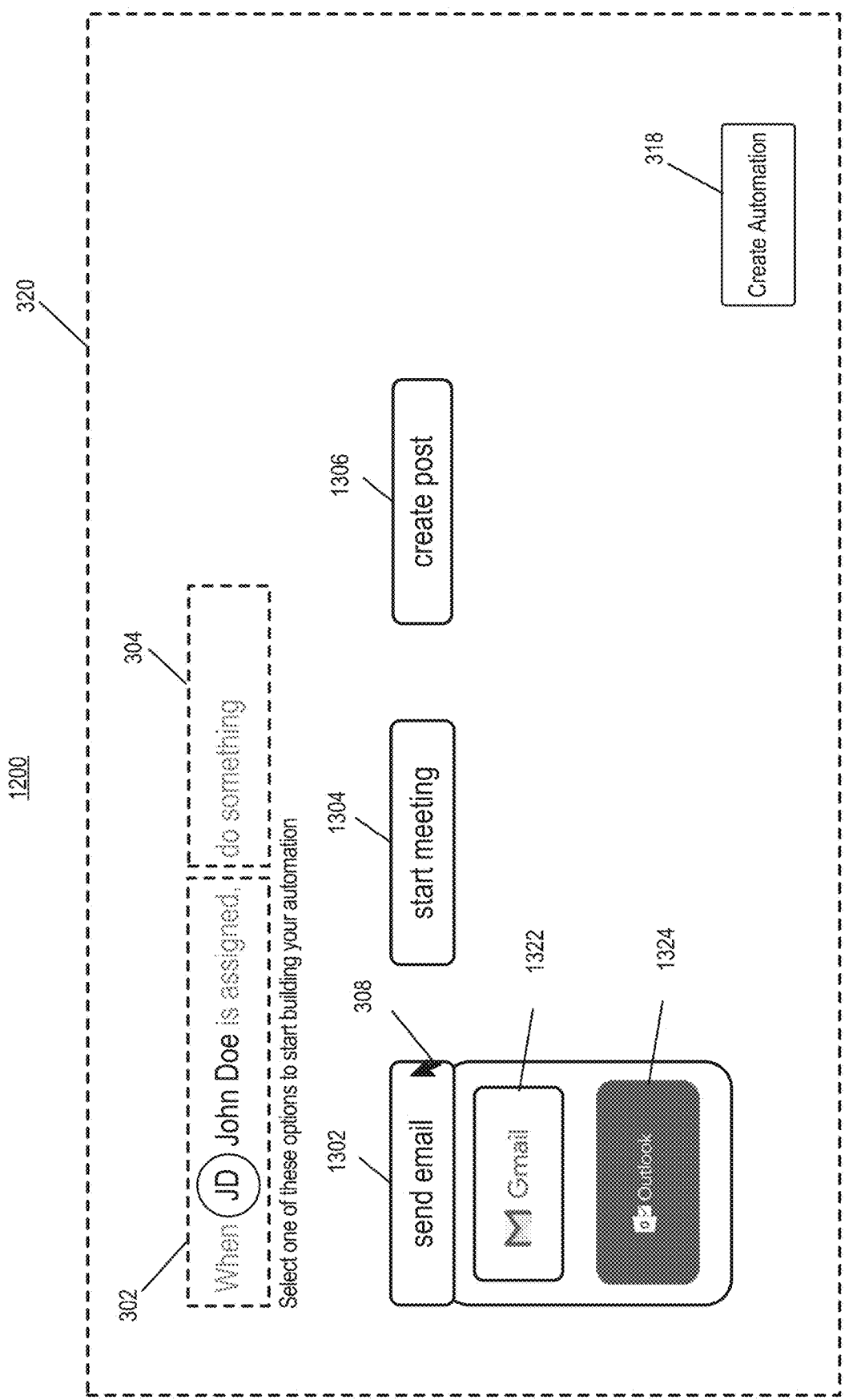
FIG. 13 illustrates an example of an automation definition in an intermediate stage of building an automation, consistent with some embodiments of the present disclosure.

FIG. 13 illustrates an example of an automation definition 1300 in an intermediate stage of building an automation, consistent with embodiments of the disclosure. Automation definition 1300 is in a stage of building an automation upon defining a condition for condition 302, and in which a user is to select among various categories of external blocks for defining an action for action 304. Graphical user interface 320 may be configured so as to organize blocks in a manner such that related blocks are grouped together. For example, as shown in FIG. 13, a first block group 1302, a second block group 1304, and a third block group 1306 may be displayed in a lower region of graphical user interface 320. Although features (e.g., blocks and any other feature) of a graphical user interface are described as being displayed in specific regions (e.g., top, bottom, and so on) of the GUI, this is only exemplary and persons skilled in the art would recognize that these features may, in general, be displayed in any region of the GUI. Graphical user interface 320 may be changed in accordance with manipulations of cursor 308. For example, a user may mouse over first block group 1302 and first block group 1302 may expand. Selectable options within first block group 1302 may be presented. First block group 1302 may correspond to an email function and may include a first third party email application 1322 and a second third party email application 1324. A user may select one of the blocks in the expanded group to further construct automation definition 1300. The selected block may be used to define action 304.

In some embodiments, the system may be configured to cause a presentation on a display a plurality of internal blocks and a plurality of external blocks, wherein an automation definition may be constructed of at least one internal block and at least two external blocks. In some embodiments, each of the at least two external blocks may link to differing external third party applications. External blocks may be configured to trigger functionality of the third party applications. External blocks may be linked to external third party applications, such as a chat application, an email application, a messenger application, a meeting application, a video conferencing application, a customer relationship management application, a file sharing application, an advertising application, a calendar application, a social networking application, a survey application, an event scheduling application, a blogging application, or any application for achieving functionality using a third party platform.

As shown in FIG. 5, a plurality of internal blocks and a plurality of external blocks are displayed in graphical user interface 320. A processor may be configured to cause a presentation on a display a plurality of internal blocks and a plurality of external blocks. Graphical user interface 320 may be displayed on a display, such as a computer monitor, mobile phone, tablet, laptop, wearable device, or any other device capable of displaying a graphic representation of an automation definition. Automation definition 500 may be constructed of any combination of internal and external blocks.

As shown in FIG. 7, there may be provided, for example, a block for triggering functionality of a third party chat application, a block for triggering functionality of a third party messaging application, and a block for triggering a meeting.

FIG. 11 illustrates an example of an automation definition 1100 in a final stage of building an automation, consistent with embodiments of the disclosure. Automation definition 1100 is in a stage of continuing to build an automation upon adding multiple actions in action 304. Automation definition 1100 may include at least two external blocks that link to differing external third party applications. As shown in FIG. 11, action 304 may include first action 902, second action 1002, and third action 1102. The multiple actions may be joined by connector 908. Third action 1102 may be based on an external block that is different from that of first action 902. In some embodiments, third action 1102 may be based on an internal block.

A processor maintaining the primary application may also be configured to alter at least one specific external block. In response to alteration of an external block, the alteration may be stored for a later automation definition. Storing an alteration for later automation definition may include storing an alteration, as described previously above, in a repository such it may be accessed at a later time and reused for an automation definition. For example, a user's default selection of a preferred third party email application may be stored in the primary application. A user's default selection of a preferred third party meeting application may be stored. A user's default selection of a preferred third party application for any particular block may be stored. In some embodiments, a custom template may be created that stored the user's selections. Any alterations to external blocks may be stored and may be loaded upon selecting the custom template for later use in creating another automation definition.

For example, as shown in FIG. 13, an external block may include first block group 1302. Based on user input (e.g., selecting one of first third party email application 1322 or second third party email application 1324), first block group 1302 may be altered. The selected third party email application may be designated as a default application for the particular functionality associated with first block group 1302 and may made to display either of first third party email application 1322 or second third party email application 1324 as the top position of the expanded state of first block group 1302. In some embodiments, a rapid construction process may be used and a user may simply select, for example, an external block associated with sending an email and an action may be defined using the user's default preference for third party email applications. A separate step may be provided for altering the user's preference. In some embodiments, a default selection for a third party application for a particular external block may be saved and may be automatically inserted into an automation definition. In some embodiments, a default selection may be used to construct a part of an automation definition while still presenting options to the user to change the particular third party application involved.

Figure 14:
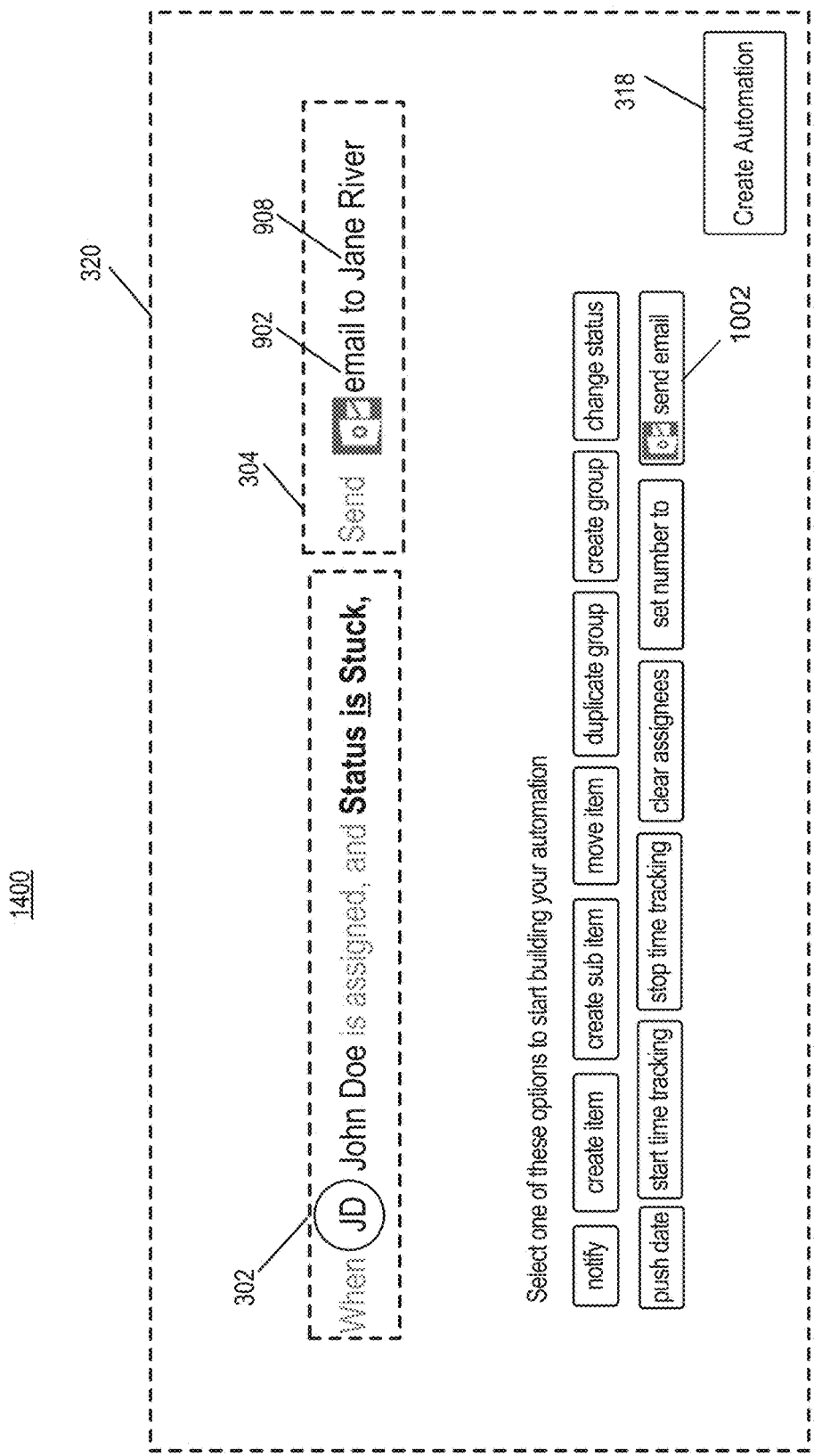
FIG. 14 illustrates an example of an automation definition in an intermediate or final stage of building an automation, consistent with some embodiments of the present disclosure.

FIG. 14 illustrates an example of an automation definition 1400 in an intermediate or final stage of building an automation, consistent with embodiments of the disclosure. Automation definition 1400 is in a stage of building an automation upon defining a condition for condition 302, and in which a user is to select among various actions using internal or external blocks for defining an action for action 304. Graphical user interface 320 may be configured to display external blocks in a manner such that only one third party application is associated with a particular function. For example, for sending an email, only one third party email application may be displayed as block 1002, although different third party email applications may be available. The particular third party application corresponding to block 1002 may be determined based on previous user input. The particular third party application may be set based on user preferences. The particular third party application may be that last used by the user for a particular function. The particular third party application may be determined based on a custom template.

In FIG. 14, although only one third party application may be shown for block 1002 for a particular function (e.g., sending an email), block 1002 may be altered so that other third party applications may be selected. Upon selecting block 1002, options may be presented in graphical user interface 320 for selecting a different third party application. Customizable object 910, as discussed above with reference to FIG. 9, may be used.

In some embodiments, the primary application may be configured to monitor a response from third party applications such that if the response fails to meet a condition of at least one specific cell of the primary application, the primary application may be configured to initiate an action. A response from a third party application may include a response to a query from a primary application to obtain information from the third party application. A response that fails to meet a condition of a specific cell of the primary application may include a threshold condition of the specific cell not being met. As a result of the failure to meet the condition, the system may be configured to initiate an action, such as updating data in the at least one specific cell to present an indication (e.g., a status) that the condition is not met. For example, a table may include a watch list of stocks that a user is interested in. The table may include a column for stock ticker and a column for a limit price. The limit price may be a price at which the user desires to purchase or to sell the stock. A condition for an automation definition may include a stock ticker reaching the limit price. In some embodiments, a condition may include a stock ticker failing to reach the limit price. An automation definition may be constructed such that actions are performed on the basis of data input into the table. The primary application may be linked with third party applications and may communicate with them to monitor for conditions and to initiate actions. In the example of an external block of a stock alert and a third party application including a stock quote application, the primary application may monitor for conditions based on information in the table of the primary application or information coming from the third party application. The primary application may monitor a response from the stock quote application and may compare a price for a particular stock to a limit price for the corresponding stock in the table of the primary application. If the stock price reaches the limit price, actions may be triggered, such as notifying the user, or causing a third party brokerage application to buy or sell a stock. In some embodiments, if the stock price fails to reach the limit price, the primary application may initiate an action, such as notifying the user, or performing any other action that may use internal or external blocks. The primary application may be configured to monitor a condition for a predetermined time period. For example, the primary application may monitor the stock price of a stock during regular trading hours. At the end of regular trading hours, the primary application may initiate an action. In some embodiments, the primary application may monitor the stock price during extended trading hours, or any other time period that may be designated.

Figure 15:
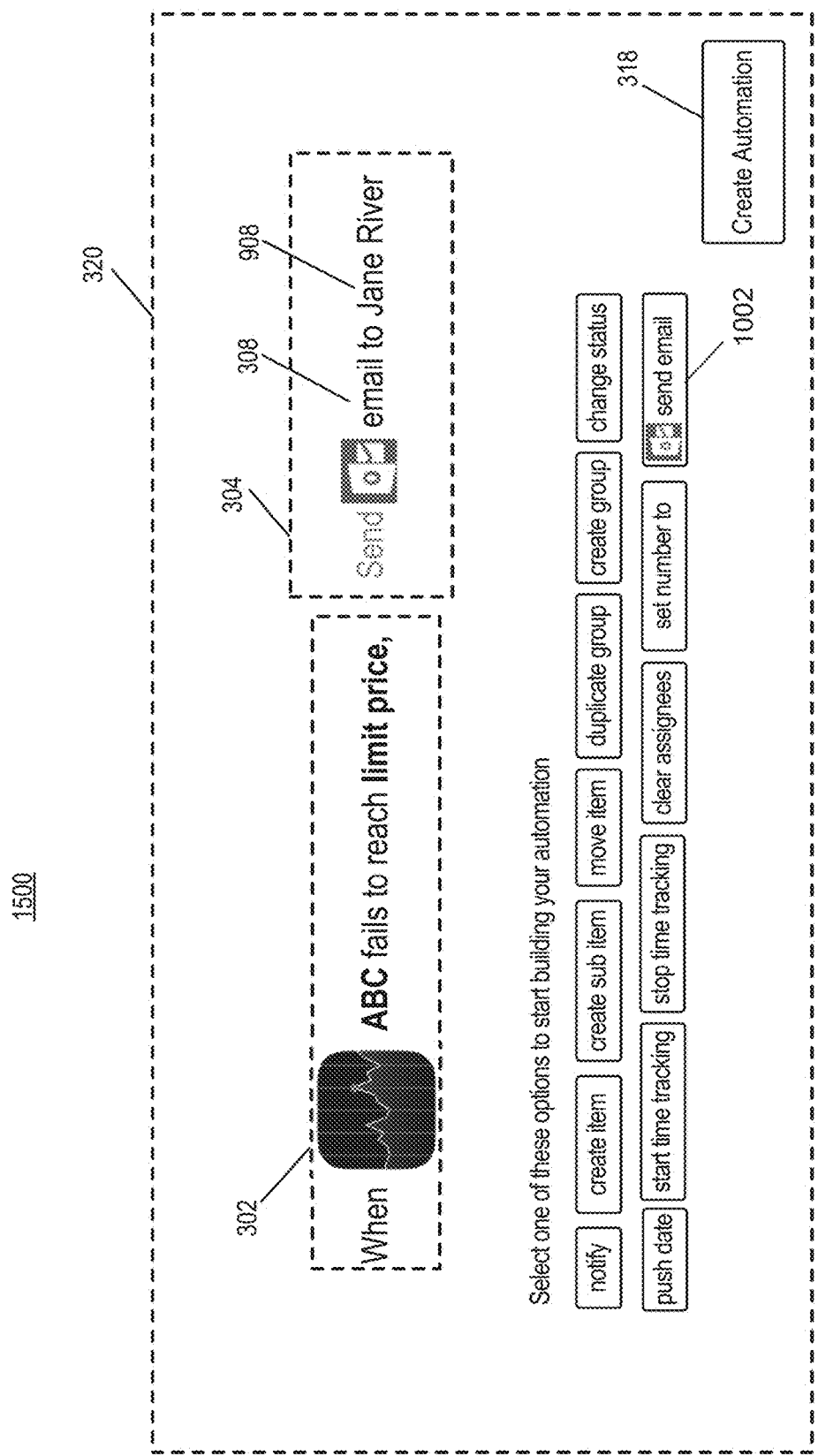
FIG. 15 illustrates an example of an automation definition in an intermediate or final stage of building an automation, consistent with some embodiments of the present disclosure.

FIG. 15 illustrates an example of an automation definition 1500 in an intermediate or final stage of building an automation, consistent with embodiments of the disclosure. Automation definition 1500 is in a stage of building an automation upon defining a condition for condition 302 and selecting an action for action 304. Condition 302 may be constructed using an external block and may include a stock alert. Condition 302 may be configured so that the primary application monitors a response from a third party application associated with the external block.

Figure 16:
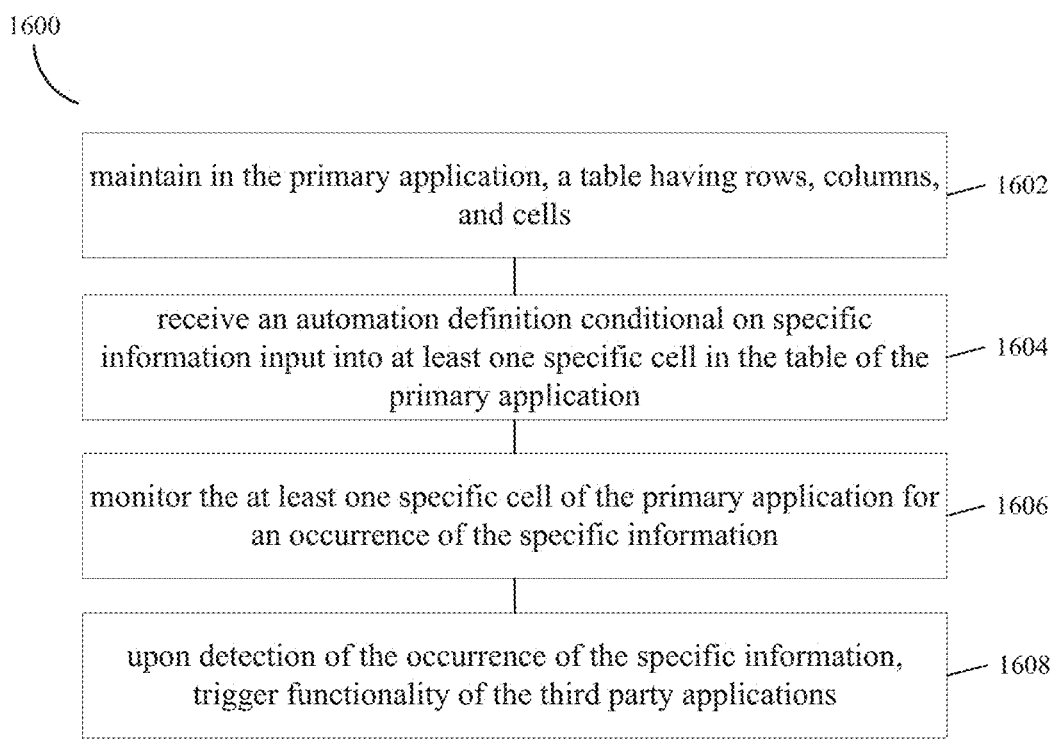
FIG. 16 is a block diagram of an example process for remotely automating changes to third party applications from within a primary application, consistent with some embodiments of the present disclosure.

FIG. 16 illustrates a block diagram of method 1600 performed by a processor of a computer readable medium containing instructions, consistent with some disclosed embodiments. In some embodiments, the method may include these steps:

Block 1602: Maintain in the primary application, a table having rows, columns, and cells at intersections of the rows and columns, wherein the primary application may be configured to enable the construction of automations defined by conditional rules for altering internal information in the primary application and external information in the third party applications.

Block 1604: Receive an automation definition conditional on specific information input into at least one specific cell in the table of the primary application, wherein the automation definition may be constructed using internal blocks and external blocks, the external blocks having links to the external third party applications.

Block 1606: Monitor the at least one specific cell of the primary application for an occurrence of the specific information.

Block 1606: Upon detection of the occurrence of the specific information, trigger functionality of the third party applications.

It is appreciated that the above described embodiments may be implemented by hardware, or software (program codes), or a combination of hardware and software. If implemented by software, it may be stored in the above-described computer-readable media. The software, when executed by the processor may perform the disclosed methods. The computing units and other functional units described in the present disclosure may be implemented by hardware, or software, or a combination of hardware and software. One of ordinary skill in the art will also understand that multiple ones of the above described modules/units may be combined as one module or unit, and each of the above described modules/units may be further divided into a plurality of sub-modules or sub-units.

In the foregoing specification, embodiments have been described with reference to numerous specific details that may vary from implementation to implementation. Certain adaptations and modifications of the described embodiments may be made. Other embodiments may be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art may appreciate that these steps may be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Aspects of this disclosure may provide a technical solution to challenges associated with collaborative work systems. Disclosed embodiments include methods, systems, devices, and computer-readable media. For ease of discussion, a system is described below with the understanding that the disclosed details may equally apply to methods, devices, and computer-readable media.

Some disclosed embodiments may involve troubleshooting faulty automations in tablature. Consistent with earlier disclosure, tablature may refer to a board or a table containing information. An automation, also referred to as a logical sentence structure, as described earlier may refer to a logical rule with one or more logical connectors, and configured to act on table data to produce an outcome. An automation may also be considered as a "recipe" having a logical organization of elements for implementing a conditional action. The automation, for example, may be in the form of a recipe, a template, or a sentence including one or more triggering elements (also referred to herein as "triggers") and one or more action elements (also referred to herein as "actions"). A faulty automation may refer to an automation as described earlier which does not perform as expected, has failed, or otherwise produced an unexpected result or irregularity from an intended result. While not limited in application to tables containing data automations, automations may apply to data stored in tables or boards as defined earlier. Maintaining a table containing data may include storing or managing the storage of a table and its data in a repository for later access and retrieval. The processor and processes required to maintain a table are defined previously above and may maintain the table by sending/receiving network packets, verifying connections, activating a graphical user interface (GUI), verifying updates, encrypting communications, or performing any other actions to make a table accessible.

Some embodiments may include storing a plurality of logical sentence structures that serve as logical rules to conditionally act on the data in the table, wherein each logical rule may be enabled to act at differing times in response to differing conditional changes. A logical sentence structure is described earlier and may refer to a representation of an automation configured or configurable to perform a function related to data in a table. Logical rules may refer to underlying logic created by an automation, which may be hidden from the user by the automation, or which may be at least partially revealed through observation of the logical sentence structure. Underlying logic may be in a form of a script, assembly language, block diagram or any other form understandable by a processor or generic computer. Differing conditional changes may refer to modifications to data associated with a board. Such changes may occur manually or automatically. Such changes may invoke the trigger of a logical rule causing the logical rule to act (e.g., an automation may be launched). For example, change in data may include any change such as the addition, deletion, rearrangement, or any combination thereof of information contained in a table (e.g., a changed status, newly entered data, removal of old data, modification of existing data). When there are multiple logical rules that act on differing conditional changes, each of the logical rules might be activated the moment each differing condition is met. Each of the logical rules may be said to act at differing times because each logical rule will activate when their respective condition is met, which may occur at differing times. However, if multiple logical rules depend on an identical conditional change, those multiple logical rules may act simultaneously or near simultaneously because they are triggered by the same conditional change. Further, in response to a condition being met, while a logical rule monitoring for that condition may be enabled to act immediately, the logical rule may also be configured to act at a later time after the condition is met (e.g., send a notification to an individual 10 minutes after a status changes to "Done").

Disclosed embodiments may involve activating the logical rules so that each rule is in effect simultaneously. Activating logical rules may refer to a process of establishing, initiating, enabling, starting, beginning, or otherwise setting up a logical rule so that it is ready to act upon detection of a triggering event (e.g., a change). Activating logical rules so that each rule is in effect simultaneously may therefore refer to enabling logical rules to be actively monitoring for each logical rule's condition. For example, there may be a plurality of logical rules that each may be toggled on and off to be "active." In such exemplary situations, when two logical rules are toggled to an "on" position, the two rules may be said to be in effect simultaneously. When a specific condition is met for a specific logical rule, that specific logical rule may then be triggered to carry out an action. As each logical rule performs an action on the data, some disclosed embodiments may record the action and an associated time stamp in an activity log. An action on the data may refer to adding, changing, deleting, transmitting, or any other action or a combination thereof that may affect data associated with a table. An activity log may refer to an organized data ledger, table, board, or any other type of data storage. An activity log may contain an action type, time stamp, action status, occurring errors if any, or any other metadata describing any action. The activity log may be hidden from view or may be presented on a client device or any display. For example, the activity log may continuously store information about the data and actions taken on the data.

Aspects of this disclosure may also involve receiving a query to identify most recent actions performed on the table. A query may refer to a signal request to initiate an action, such as a request for retrieving information from a database. Most recent actions performed on the table may refer to the latest action performed (e.g., by an automation or manually be a user) on the table, such as the last action taken or the most recent actions in a time period (e.g., actions in the last hour, actions in the last day, week month, and so on). Some embodiments may also involve the query being generated in response to a potential irregularity in an operation of at least one of the logical rules. A potential irregularity may refer to any deviation from an intended operation of an automation such as an overuse of computing resources, timing out of one or more tasks, looping, or any other unusual activity caused by the automation. In such an event, some disclosed embodiments may be configured to identify a source of the potential irregularity and display an associated logical sentence structure. The associated logical sentence structure that is displayed may include the logical sentence structure containing the potential irregularity. For example, in the event of timeout occurring, a logical sentence structure (e.g., automation) causing the timeout may be displayed for further configuration to modify the logical sentence structure.

After the query is received some disclosed embodiments may access the activity log to identify at least one most recent action performed on the table and present at least one specific logical sentence structure underlying at least one logical rule that caused the at least one most recent action. An underlying logical rule may refer to the logical rule operated and defined by the logical sentence structure or any other automation. A logical rule may be defined by a sentence structure. Thus, when the rule that caused a most recent action is identified, the sentence structure that underlies (e.g., defines) that rule may be identified. By way of example, logical sentence structure may be configured to send an email after certain change to data is made. In this exemplary situation, the automation will monitor for data changes, and after the data change is detected, the automation will then send an email. If automation is successful, the action of sending the email is considered the latest step. Should the automation fail (e.g., because there is no email address to send the message or any other error that may occur), the last action recorded may be an indication of a failure to send the email. This result and recorded last action may be presented on a graphical user interface or any other way preferred by the user. The presentation may include causing the at least one logical sentence structure to appear on a display, such as on a screen, client device, projector, or any other device that may present the at least one logical sentence structure, as previously disclosed.

Figure 17:
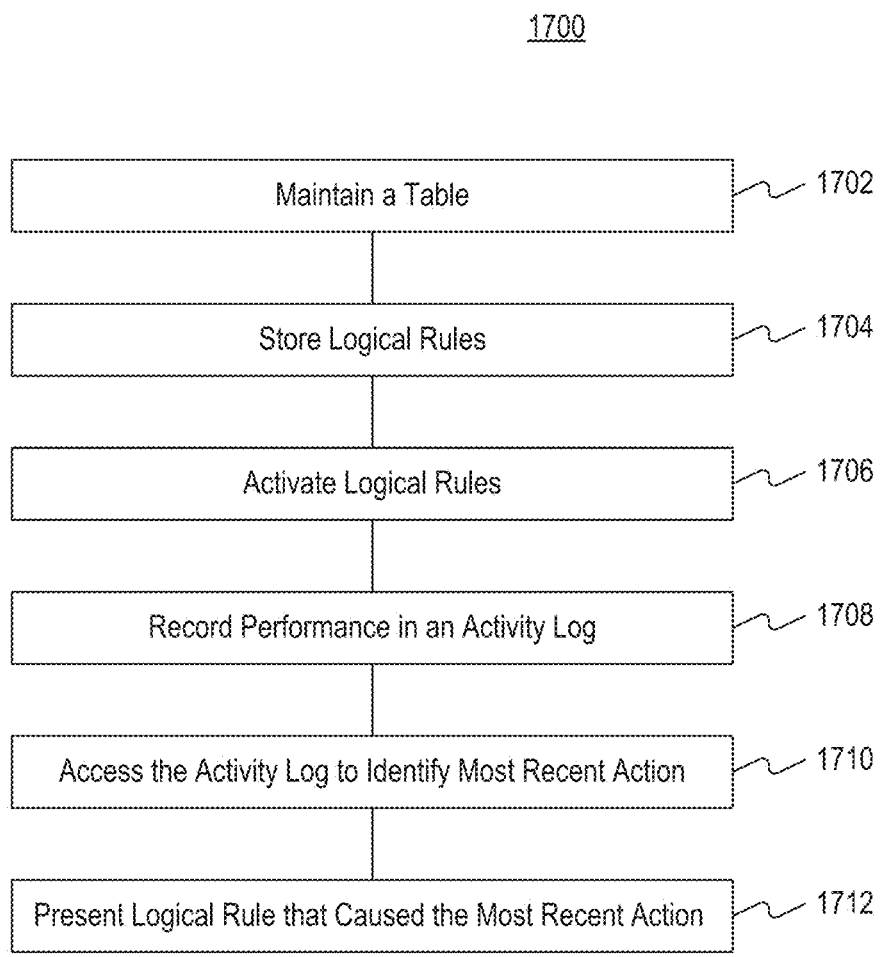
FIG. 17 is a block diagram of an exemplary method for troubleshooting faulty automations in tablature, consistent with some embodiments of the present disclosure.

FIG. 17 illustrates a block diagram of an exemplary method 1700 for troubleshooting faulty automations in tablature. This may occur, for example, in a collaborative work system. Method 1700 may be performed by the computing device 100 in conjunction with computing architecture 200 as depicted and described above with references to FIG. 1 and FIG. 2. Method 1700 may begin at block 1702 by maintaining the table with rows and columns defining cells containing the category indicators, as described previously and further detail above. Method 1700 may proceed to block 1704 by storing a plurality of logical sentence structures that serve as logical rules to conditionally act on the data in the table, wherein each logical rule may be enabled to act at differing times in response to differing conditional changes, consistent with earlier disclosure. Method 1700 may continue to block 1706 to activate the logical rules so that each rule is in effect simultaneously as described in more detail herein. Following block 1706, method 1700 may proceed to block 1708 recording the action and an associated time stamp in an activity log as each logical rule performs an action on the data consistent with the earlier disclosure. At the next block 1710, method 1700 may receive a query to identify most recent actions performed on the table and access the activity log to identify at least one most recent action performed on the table consistent with earlier disclosure. Finally, method 1700 may include block 1712 by presenting at least one specific logical sentence structure underlying at least one logical rule that caused the at least one most recent action.

Aspects of this disclosure may involve receiving updates to the plurality of logical sentence structures, the updates including changes to logical sentence structure variables that alter associated logical rules, and wherein at least one processor may be further configured to log and timestamp each update. Logical sentence structure variables may refer any to any parameter, constraint or condition that may be changed. These may include, for example, table, row/column identifiers, names, conditions or otherwise replaceable components of an automation. If such variables are modified, any such modification may be tagged, logged, and time stamped. A user may be presented with an interface displaying variables changed via the at least one most recent update, consistent with the earlier disclosure. The most recent update refer to the last (or a recent) modification or alteration made in at least one of the last few minutes, last hour, last day, last week, last month, last year, or any other period of time in the past.

Figure 18:
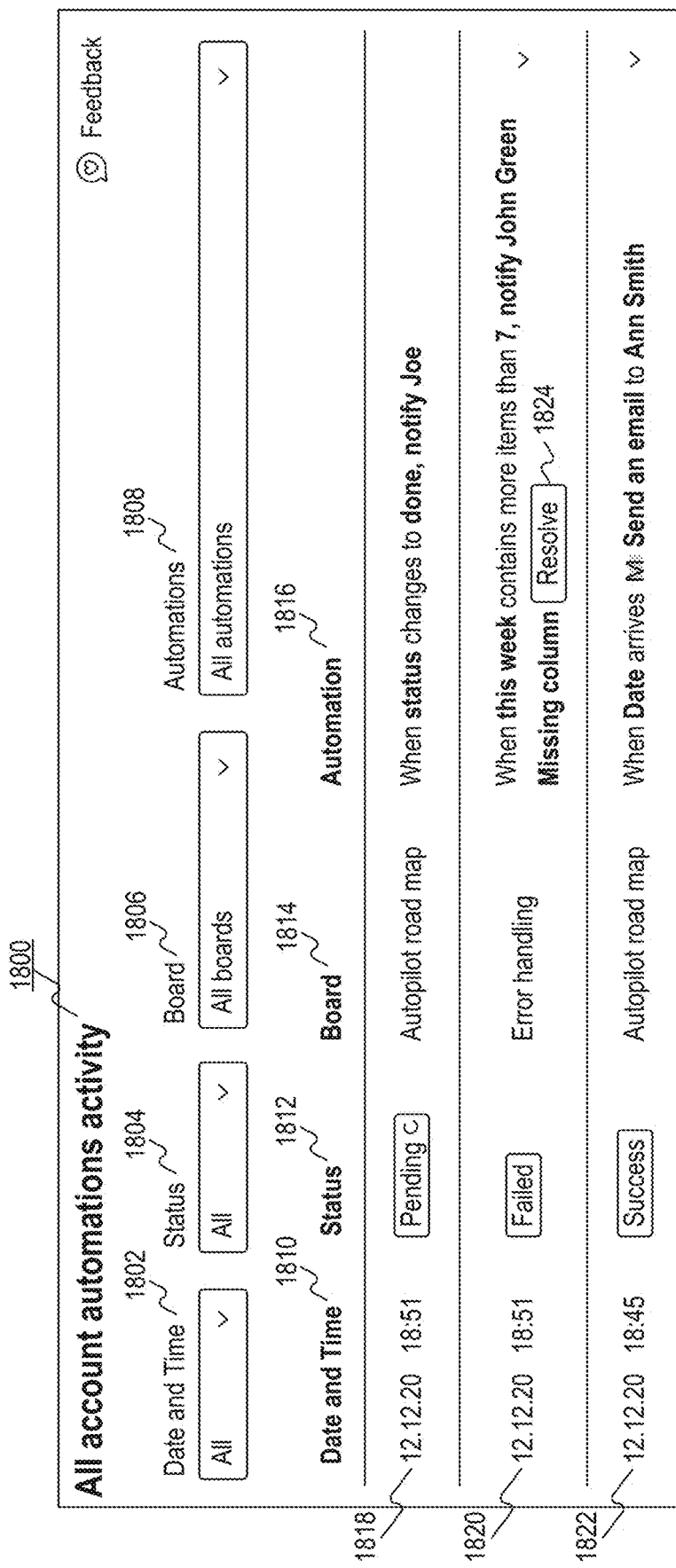
FIG. 18 is an exemplary representation of a collapsed account activity viewing interface of a system for troubleshooting faulty automations in tablature, consistent with some embodiments of the present disclosure.

In FIG. 18 for example, an automation under the automation heading 1816 may receive updates to change the variables, including the conditions (e.g., "When Date arrives" and "When status changes to done") and actions (e.g., "send an email to Ann Smith" and "notify Joe"). Each of the changes indicated by change entries 1818, 1820, and 1822 may include a time stamp under Date and Time heading 1810 to reflect when the change was made. Each of the change entries may reflect the changes that were made under the automation heading 1816 so that a user may follow each of the updates made to the automation in sequential order and determine which change may have caused an error in the normal operation of the automation. While FIG. 18 illustrates a filter for all changes made, a user may also filter the changes based on a date and time using the Date and Time filter 1802 to view the changes made in the last few minutes, last hour, last day, last week, last month, last year, or any other time period.

Some embodiments may involve receiving an indication of a type of irregularity occurring on the table. An irregularity may include any deviation from a normal operation of the table, such as timeout, overuse of computing resource or any other unusual activity within the automation as described earlier. An indication of the type of irregularity may be any visual cue, audio cue, or a combination thereof that alerts the system or the user that an irregularity has occurred on the table. For example, a visual cue may include a pop-up message, a presentation of a graphical symbol that indicates a warning, an animation such as a flashing indication, or any other indicator displayed on a client device. In such an event, the system may proceed with identifying a particular logical sentence structure likely to be associated with the irregularity and displaying the particular logical sentence structure. The particular logical sentence structure may refer to a particular automation that contains an irregularity. For example, in the event of timeout occurring while sending an email, the particular logical sentence structure causing the timeout may be in communication with an email server but might not be able to fully transmit the email due to an error such as an incorrect email address, the lack of an email address, or any other irregularity. Because of this irregularity, the system may display this particular automation consistent with the earlier disclosure. The display of the particular logical sentence structure may also include a display of a variable recently changed in the particular logical sentence structure consistent with earlier disclosure. For example, a user or entity may modify an automation to send an email to a new email address. In response to this modification, the system may display the new email address as the variable recently changed, so that the user may identify a recent change that may have caused an irregularity.

Similarly, as described earlier with relation to block 1712 in FIG. 17, presenting may include at least one logical sentence structure to appear on a display as also shown on the exemplary FIG. 18 through FIG. 21. FIG. 18 illustrates an exemplary representation of a collapsed account activity viewing interface 1800 of a system for troubleshooting faulty automations in tablature. View 1800 may be filtered by date and time 1802, status 1804, board 1806, or/and automations 1808. While not depicted, additional filters may be implemented. Date and time filter 1802 may enable a user to filter by a time stamp. Each automation may include individual time stamps for various steps included with the automations (as shown by the example provided with a reference to FIG. 19 and described later in the disclosure). Date and time filter 1802 may utilize any time stamp 1810 associated with the automations to filter appropriate rows within the table. Filtering may be enabled via a drop-down menu as depicted on the exemplary embodiment, or any other technique for interaction with a user interface. Similarly, status filter 1804 allows filtering of the view 1800 to only show rows with specific status 1812 or exclude certain statuses. For example, if a user troubleshooting the automation only would like to check on failed activities, the user may utilize view 1800 to view by a "failed" status and reconfigure those particular automations. As depicted, "Success" status 1822 corresponds to a configured automation that did not encounter any issues and performed as expected; "Pending" status 1818 corresponds to an automation currently processing that may be monitored by the user in a real-time; "Failed" Status 1820 corresponds to an automation that did not perform as expected and may display a reason for failure as depicted, and a button (or any other interactive element) 1824 to assist in resolving the issue. The "Failed" status may be an example of an indication of an irregularity. The system may also include mapping of different reasons for failures associated with automations and integrations. In some instances, the system may rate or score the severity of the failures, which may be included in a notification to a user or administrator to communicate the failure and/or to provide information needed to correct the failure. Likewise, filters such as board filter 1806 and automation filter 1808 enabled filtering by boards 1814 and automations 1816, respectively allowing a troubleshooter to fine tune the account automation activity as needed. The tool, for example, may provide administrative level information of the failures such as the date of the generation of the rule and any configuration edits to the automations. Further, the system may be configured to automatically or manually disable specific automations, in some instances, in response to the detection of a failure.

FIG. 19 illustrates an exemplary representation of an expanded account activity view interface 1900 of a system for troubleshooting faulty automations in tablature. Each log item depicted in the earlier described collapsed view 1800 may be expanded by the user/troubleshooter. Expansion may be performed by clicking on expand buttons 1922, 1924, and 1926 as depicted in FIG. 19, which is not limited to the depicted example and may be carried out by any other interactive user interface technique to achieve a similar result. Expanded view 1900 may provide additional information to the troubleshooter. For example, for each automation 1902, 1908, and 1914, each logical rule or step of the automation may be displayed with corresponding information about each element. Specifically with relation to exemplary representative automation 1902, the automation may be expanded by clicking on button 1922 to display logical rules 1904 and 1906, wherein logical rules may display additional information about the underlying process, such as irregularities, completed actions, a current status, and so on. Similarly, automations 1908 and 1914 may be expanded via buttons 1924 and 1926 respectively to show underlying logical rules 1910 and 1912 for automation 1908 and logical rules 1916 and 1918 for automation 1914 as depicted in FIG. 19.

Figure 20:
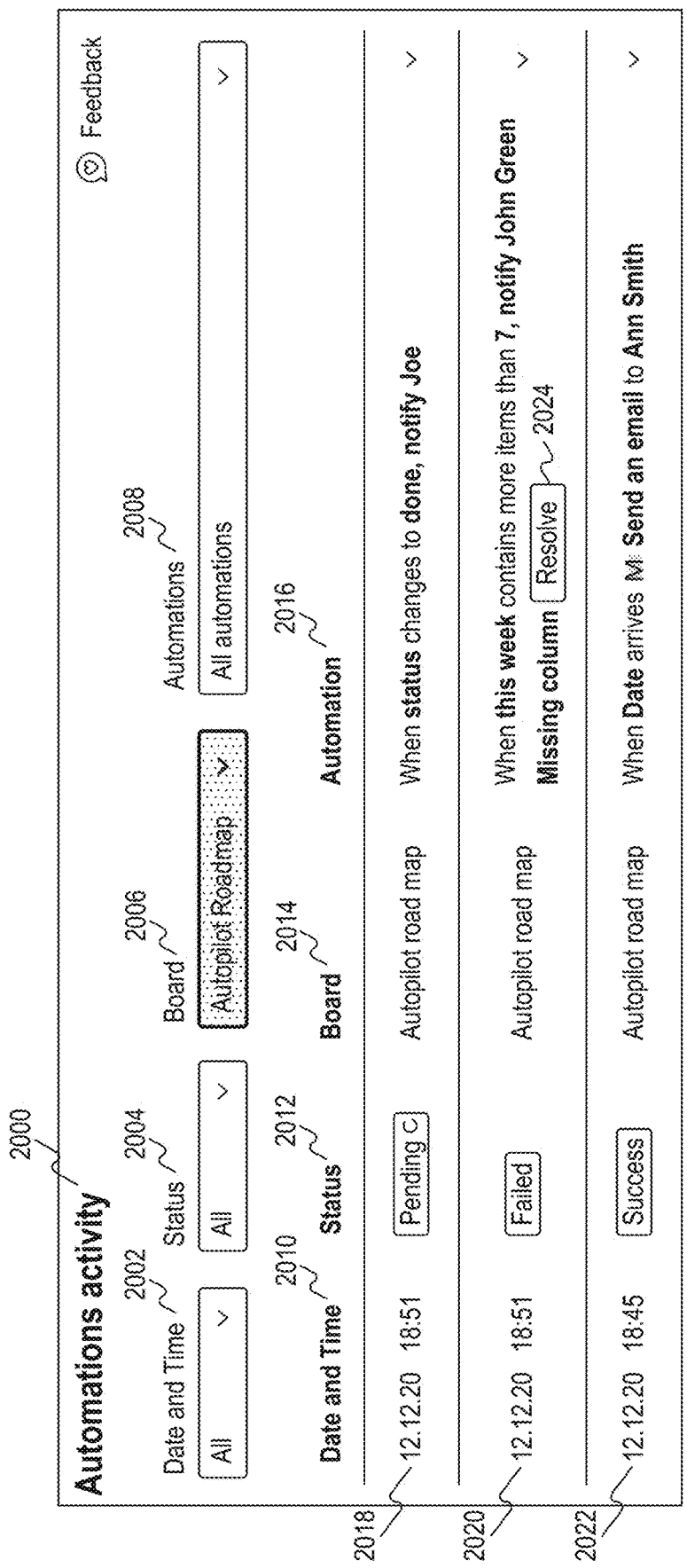
FIG. 20 is an exemplary representation of an automation activity interface of a system for troubleshooting faulty automations in tablature, consistent with some embodiments of the present disclosure.

FIG. 20 illustrates another exemplary representation of an automation activity interface 2000 of a system for troubleshooting faulty automations in tablature. Filters 2002, 2004, 2006, and 2008 are consistent with embodiments of the earlier disclosure. FIG. 20 depicts a selection of a board filter 2006. By making such a selection, as previously described, a troubleshooter may view a particular automation affecting a specific board within the environment. In FIG. 20, automations 2018, 2020, and 2022 are displayed regardless of the current status associated with each automation as they are enabled on the selected board. Additional information may be displayed in columns for date and time 2010, status 2012, board 2014, and automation 2016, consistent with the earlier disclosure. Button 2024 may be activated to resolve the exemplary failed automation 2020. Button 2024 may also be accompanied by a brief description of the occurred irregularity as shown for automation 2020.

FIG. 21 illustrates an exemplary representation of an automation activity interface with applied filters 2100 of a system for troubleshooting faulty automations in tablature. Filters 2102, 2104, 2106, and 2108 are consistent with the earlier disclosure. Filters may be combined to allow for a finer level of filtering the information. FIG. 21 illustrates automations within a specific board filter 2106 and with a specific automation filter 2108. Illustrated examples of automations in FIG. 21 show varying statuses of "successful" 2122, "pending" 2118, and "failed" 2120 automations with a shared step of "send an email" as shown in automation column 2116. Additionally, the reasons for an improperly working automation (e.g., indicated by a "failed" status, a deleted column, an API rate limit, a revoked token or authorization, and/or any other circumstance that results in a dysfunctional automation) may be displayed and accompanied with a hyperlink 2124 to resolve the identified issue. This may be particularly useful to a troubleshooter trying to narrow down to a specific issue and resolve the specific issue directly. Additional information may be displayed in columns for Date and Time 2110, Status 2112, Board 2114, and Automation 2116, consistent with the earlier disclosure.

FIG. 22 illustrates another exemplary representation of a board automation view 2200 which may be an interface of a system for troubleshooting faulty automations in tablature. View 2200 is particular to a specific board and enables configuration of all automations within the selected board. A board activity log may be viewed in response to selecting a board activity button 2202. New automations may be added by a button 2204. Existing automations may be turned on/off, modified, or removed. Specifically, as shown on the exemplary representation in view 2200, modifications may be made via control mechanisms referenced at toggle buttons 2208, 2214, 2220, and 2226. View 2200 may also provide a troubleshooter with additional information such as the logical rule and variables associated with an automation 2206. Additional information 2206 may include an automation ID, creator ID, last modified date, or any other information related to the automation. Additional information 2206 may be used for targeted search of specific automation tasks within the system to improve troubleshooting of the affected automation. Specifically, as shown on the exemplary representation, additional information may be displayed under the control mechanisms as shown with controls 2210, 2216, 2222, 2228.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include any one of the following bullet-pointed features alone or in combination with one or more other bullet-pointed features, whether implemented as a method, by at least one processor, and/or stored as executable instructions on non-transitory computer-readable media:

maintaining in the primary application, a table having rows, columns, and cells at intersections of the rows and columns;

wherein the primary application is configured to enable the construction of automations defined by conditional rules for altering internal information in the primary application and external information in the third party applications;

receiving an automation definition conditional on specific information input into at least one specific cell in the table of the primary application;

wherein the automation definition is constructed using internal blocks and external blocks, the external blocks having links to the external third party applications;

monitoring the at least one specific cell of the primary application for an occurrence of the specific information;

upon detection of the occurrence of the specific information, triggering functionality of the third party applications;

causing a presentation on a display a plurality of the internal blocks and a plurality of the external blocks;
wherein the automation definition is constructed of at least one internal block and at least two external blocks;
wherein the primary application is linked to the third party applications in a manner permitting the primary application to monitor data input in the third party applications;
wherein the conditional rules define changes to the primary application based on conditional data input in the third party applications;
wherein the primary application is configured to monitor a response from the third party applications, and if the response fails to meet a condition of the at least one specific cell, is configured to initiate an action;
wherein the action includes updating data in the at least one specific cell;
altering at least one specific external block, and in response to the alteration, store the alteration to the at least one specific external block for a later automation definition;
wherein each of the at least two external blocks link to differing external third party applications;
maintaining a table containing data;
storing a plurality of logical sentence structures that serve as logical rules to conditionally act on the data in the table;
wherein each logical rule is enabled to act at differing times in response to differing conditional changes;
activating the logical rules so that each rule is in effect simultaneously;
as each logical rule performs an action on the data, recording the action and an associated time stamp in an activity log;
receiving a query to identify most recent actions performed on the table;
accessing the activity log to identify at least one most recent action performed on the table;
presenting at least one specific logical sentence structure underlying at least one logical rule that caused the at least one most recent action;
receiving updates to the plurality of logical sentence structures, the updates including changes to logical sentence structure variables that alter associated logical rules;
wherein the at least one processor is further configured to log and timestamp each update;
wherein presenting at least one specific logical sentence structure that caused the at least one most recent action includes displaying variables changed via the at least one most recent update;
wherein the at least one most recent action includes an update made in at least one of the last few minutes, last hour, last day, last week, last month, or last year;
wherein the query is generated in response to a potential irregularity in an operation of at least one of the logical rules;
identifying the potential irregularity and to display an associated logical sentence structure;
receiving an indication of a type of irregularity occurring on the table, to identify a particular logical sentence structure likely to be associated with the irregularity, and to display the particular logical sentence structure;
wherein the display of the particular logical sentence structure includes a display of a variable recently changed in the particular logical sentence structure; and
wherein presenting includes causing the at least one logical sentence structure to appear on a display.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for remotely automating changes to third party applications from within a primary application, the system comprising:
   at least one processor configured to:
      maintain in the primary application, a table having rows, columns, and cells at intersections of the rows and columns, wherein the primary application is configured to enable the construction of automations defined by conditional rules for altering internal information in the primary application and external information in the third party applications;
      receive an automation definition conditional on specific information input into at least one specific cell in the table of the primary application, wherein the automation definition is constructed using internal blocks and external blocks, the external blocks having links to the external third party applications;
      monitor the at least one specific cell of the primary application for an occurrence of the specific information; and
      upon detection of the occurrence of the specific information, trigger functionality of the third party applications.

2. The system of claim 1, wherein the at least one processor is further configured to cause a presentation on a display a plurality of the internal blocks and a plurality of the external blocks, and wherein the automation definition is constructed of at least one internal block and at least two external blocks.

3. The system of claim 1, wherein the primary application is linked to the third party applications in a manner permitting the primary application to monitor data input in the third party applications, and wherein the conditional rules define changes to the primary application based on conditional data input in the third party applications.

4. The system of claim 1, wherein the primary application is configured to monitor a response from the third party applications, and if the response fails to meet a condition of the at least one specific cell, is configured to initiate an action.

5. The system of claim 4, wherein the action includes updating data in the at least one specific cell.

6. The system of claim 1, wherein the at least one processor is further configured to alter at least one specific external block; and
   in response to the alteration, store the alteration to the at least one specific external block for a later automation definition.

7. The system of claim 2, wherein each of the at least two external blocks link to differing external third party applications.

8. A non-transitory computer readable medium containing instructions that when executed by at least one processor, cause the at least one processor to perform operations for remotely automating changes to third party applications from within a primary application, the operations comprising:
   maintaining in the primary application, a table having rows, columns, and cells at intersections of the rows and columns, wherein the primary application is configured to enable the construction of automations defined by conditional rules for altering internal information in the primary application and external information in the third party applications;
   receiving an automation definition conditional on specific information input into at least one specific cell in the table of the primary application, wherein the automation definition is constructed using internal blocks and external blocks, the external blocks having links to the external third party applications;
   monitoring the at least one specific cell of the primary application for an occurrence of the specific information; and
   upon detection of the occurrence of the specific information, triggering functionality of the third party applications.

9. The non-transitory computer readable medium of claim 8, wherein the operations further comprise causing a presentation on a display a plurality of the internal blocks and a plurality of the external blocks, and wherein the automation definition is constructed of at least one internal block and at least two external blocks.

10. The non-transitory computer readable medium of claim 8, wherein the primary application is linked to the third party applications in a manner permitting the primary application to monitor data input in the third party applications, and wherein the conditional rules define changes to the primary application based on conditional data input in the third party applications.

11. The non-transitory computer readable medium of claim 8, wherein the primary application is configured to monitor a response from the third party applications, and if the response fails to meet a condition of the at least one specific cell, is configured to initiate an action.

12. The non-transitory computer readable medium of claim 11, wherein the action includes updating data in the at least one specific cell.

13. The non-transitory computer readable medium of claim 8, wherein the operations further comprise altering at least one specific external block; and
   in response to the altering, storing the alteration to the at least one specific external block for a later automation definition.

14. The non-transitory computer readable medium of claim 9, wherein each of the at least two external blocks link to differing external third party applications.

15. A method for remotely automating changes to third party applications from within a primary application, the operations comprising:
   maintaining in the primary application, a table having rows, columns, and cells at intersections of the rows and columns, wherein the primary application is configured to enable the construction of automations defined by conditional rules for altering internal information in the primary application and external information in the third party applications;
   receiving an automation definition conditional on specific information input into at least one specific cell in the table of the primary application, wherein the automation definition is constructed using internal blocks and external blocks, the external blocks having links to the external third party applications;
   monitoring the at least one specific cell of the primary application for an occurrence of the specific information; and
   upon detection of the occurrence of the specific information, triggering functionality of the third party applications.

16. The method of claim 15, the method further comprising causing a presentation on a display a plurality of the internal blocks and a plurality of the external blocks, and wherein the automation definition is constructed of at least one internal block and at least two external blocks.

17. The method of claim 15, wherein the primary application is linked to the third party applications in a manner permitting the primary application to monitor data input in the third party applications, and wherein the conditional rules define changes to the primary application based on conditional data input in the third party applications.

18. The method of claim 15, wherein the primary application is configured to monitor a response from the third party applications, and if the response fails to meet a condition of the at least one specific cell, is configured to initiate an action.

19. The method of claim 18, wherein the action includes updating data in the at least one specific cell.

20. The method of claim 15, the method further comprising altering at least one specific external block; and
   in response to the altering, storing the alteration to the at least one specific external block for a later automation definition.

* * * * *